(12) United States Patent
Tsuji et al.

(10) Patent No.: US 9,109,078 B2
(45) Date of Patent: *Aug. 18, 2015

(54) POLYMER POLYOL, METHOD FOR PRODUCING THE SAME, AND METHOD FOR PRODUCING POLYURETHANE RESIN

(71) Applicant: Sanyo Chemical Industries, Ltd., Kyoto-shi, Kyoto (JP)

(72) Inventors: Takayuki Tsuji, Kyogo (JP); Shigekuni Nakada, Kyoto (JP); Yukiya Kobayashi, Kyoto (JP); Katsuya Uchida, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,901

(22) Filed: Jun. 4, 2014

(65) Prior Publication Data

US 2014/0288238 A1 Sep. 25, 2014

Related U.S. Application Data

(63) Continuation of application No. 12/679,377, filed as application No. PCT/JP2008/067222 on Sep. 25, 2008, now Pat. No. 8,772,405.

(30) Foreign Application Priority Data

Sep. 28, 2007 (JP) ................................. 2007-255058
Jun. 27, 2008 (JP) ................................. 2008-168111

(51) Int. Cl.
| | |
|---|---|
| *C08G 18/62* | (2006.01) |
| *C08G 18/32* | (2006.01) |
| *C08F 283/06* | (2006.01) |
| *C08L 75/08* | (2006.01) |
| *C08L 71/02* | (2006.01) |
| *C08L 35/06* | (2006.01) |
| *C08G 18/63* | (2006.01) |
| *C08K 5/05* | (2006.01) |
| *C08K 5/06* | (2006.01) |
| *C08K 5/12* | (2006.01) |
| *C08K 5/13* | (2006.01) |
| *C08K 5/205* | (2006.01) |
| *C08F 290/06* | (2006.01) |
| *C08G 18/67* | (2006.01) |
| *C08L 71/08* | (2006.01) |
| *C08G 101/00* | (2006.01) |

(52) U.S. Cl.
CPC ............ *C08G 18/632* (2013.01); *C08F 283/06* (2013.01); *C08F 283/065* (2013.01); *C08F 290/062* (2013.01); *C08G 18/3215* (2013.01); *C08G 18/62* (2013.01); *C08G 18/636* (2013.01); *C08G 18/672* (2013.01); *C08K 5/05* (2013.01); *C08K 5/06* (2013.01); *C08K 5/12* (2013.01); *C08K 5/13* (2013.01); *C08K 5/205* (2013.01); *C08L 35/06* (2013.01); *C08L 71/02* (2013.01); *C08L 71/08* (2013.01); *C08L 75/08* (2013.01); *C08G 2101/005* (2013.01); *C08G 2101/0008* (2013.01); *C08G 2101/0083* (2013.01)

(58) Field of Classification Search
IPC ................ C08G 18/3215,18/62, 18/632, 18/48, C08G 18/636, 18/672, 2101/005, 2101/0008, C08G 2101/0083; C08K 5/05, 5/06, 5/12, C08K 5/13, 5/205; C08F 283/06, 283/065, C08F 212/10, 290/062; C08L 35/06, 71/02, C08L 71/08, 75/08, 2666/04, 2666/14

See application file for complete search history.

(56) References Cited

U.S. PATENT DOCUMENTS

| | | |
|---|---|---|
| 3,383,351 A | 5/1968 | Stamberger |
| 4,148,840 A | 4/1979 | Shah |
| 4,192,928 A | 3/1980 | Tanaka et al. |
| 4,196,476 A | 4/1980 | Steiner |
| 4,226,756 A | 10/1980 | Critchfield et al. |
| 4,230,823 A | 10/1980 | Alberts et al. |
| 4,745,153 A | 5/1988 | Hoffman |
| 5,021,506 A | 6/1991 | Gastinger et al. |
| 5,084,506 A | 1/1992 | Faler et al. |
| 5,171,759 A | 12/1992 | Hager |
| 5,196,476 A | 3/1993 | Simroth |
| 5,358,984 A | 10/1994 | Hayes et al. |
| 5,488,085 A | 1/1996 | Hayes et al. |
| 5,494,957 A | 2/1996 | Moore et al. |
| 5,814,699 A | 9/1998 | Kratz et al. |
| 6,239,224 B1 | 5/2001 | Mørk et al. |
| 6,624,209 B2 | 9/2003 | Kawamoto et al. |
| 6,756,414 B2 | 6/2004 | Kawamoto et al. |
| 8,772,405 B2 * | 7/2014 | Tsuji et al. .................. 524/736 |
| 2003/0004217 A1 | 1/2003 | Kawamoto et al. |
| 2003/0181598 A1 | 9/2003 | Heyman et al. |
| 2003/0216486 A1 | 11/2003 | Kawamoto et al. |
| 2005/0245724 A1 | 11/2005 | Horiguchi et al. |

(Continued)

FOREIGN PATENT DOCUMENTS

| | | |
|---|---|---|
| CN | 1312302 | 9/2001 |
| EP | 0 786 480 | 7/1997 |

(Continued)

*Primary Examiner* — Rabon Sergent
(74) *Attorney, Agent, or Firm* — Hamre, Schumann, Mueller & Larson, P.C.

(57) ABSTRACT

A polymer polyol (I) is provided that is formed of a polyol (A), polymer particles (B) obtained by polymerization of an ethylenically unsaturated compound (b), and an active-hydrogen-containing compound (d) having an aromatic ring and having a number-average molecular weight of 150 to 2,000, wherein a content of (d) is 1 to 20% on the basis of a weight of (B). The polymer polyol of the present invention contains polymer particles having sufficiently small particle diameters, has a low viscosity, and has excellent handleability. A polyurethane resin obtained by using the polymer polyol of the present invention has excellent mechanical strengths such as elongation at break.

13 Claims, No Drawings

(56) References Cited

U.S. PATENT DOCUMENTS

| | | |
|---|---|---|
| 2006/0025492 A1 | 2/2006 | Chauk |
| 2006/0142441 A1 | 6/2006 | Chan et al. |
| 2009/0018227 A1 | 1/2009 | Nakada et al. |
| 2010/0036082 A1 | 2/2010 | Nakada et al. |
| 2010/0222507 A1 | 9/2010 | Nakada et al. |
| 2011/0086996 A1 | 4/2011 | Nakada et al. |
| 2011/0301256 A1 | 12/2011 | Nakada et al. |
| 2011/0301257 A1 | 12/2011 | Nakada et al. |

FOREIGN PATENT DOCUMENTS

| | | |
|---|---|---|
| EP | 1 589 051 | 10/2005 |
| JP | 45-001474 | 1/1970 |
| JP | 53-085896 | 7/1978 |
| JP | 55-031880 | 3/1980 |
| JP | 62-36052 | 8/1987 |
| JP | 5-059134 | 3/1993 |
| JP | 5-148328 | 6/1993 |
| JP | 6-172462 | 6/1994 |
| JP | 7-196749 | 8/1995 |
| JP | 8-054752 | 2/1996 |
| JP | 8-067725 | 3/1996 |
| JP | 8-100006 | 4/1996 |
| JP | 8-333508 | 12/1996 |
| JP | 9-077968 | 3/1997 |
| JP | 9-124750 | 5/1997 |
| JP | 9-309937 | 12/1997 |
| JP | 10-195150 | 7/1998 |
| JP | 10-292018 | 11/1998 |
| JP | 11-130979 | 5/1999 |
| JP | 11-236499 | 8/1999 |
| JP | 2002-308920 | 10/2002 |
| JP | 2003-12706 | 1/2003 |
| JP | 2004-002800 | 1/2004 |
| JP | 2004-263192 | 9/2004 |
| JP | 2005-162791 | 6/2005 |
| JP | 2005-526155 | 9/2005 |
| JP | 2006-016611 | 1/2006 |
| JP | 2006-104236 | 4/2006 |
| JP | 2006-188685 | 7/2006 |
| JP | 2006-328261 | 12/2006 |
| JP | 2007-039677 | 2/2007 |
| JP | 2007-191682 | 8/2007 |
| WO | 01/09242 | 2/2001 |
| WO | 2007/007592 | 1/2007 |
| WO | 2008/084625 | 7/2008 |
| WO | 2008/146614 | 12/2008 |

* cited by examiner

POLYMER POLYOL, METHOD FOR PRODUCING THE SAME, AND METHOD FOR PRODUCING POLYURETHANE RESIN

TECHNICAL FIELD

The present invention relates to a polymer polyol, a method for producing the same, and a method for producing a polyurethane resin.

BACKGROUND ART

A polymer composition or a mixture obtained by polymerizing an ethylenically unsaturated compound in a polyol is referred to generally as a polymer polyol, and is used widely as a raw material for a polyurethane resin such as a polyurethane foam or a polyurethane elastomer. In recent years, a polymer polyol that contains polymer particles having a small average particle diameter has been demanded for the purpose of further improving mechanical properties such as elongation at break. An exemplary polymer polyol containing small-diameter polymer particles is a polymer polyol obtained by a production method in which a ratio of acrylonitrile used as a part of an ethylenically unsaturated compound is increased (see Patent Document 1), which includes a process in which a seed dispersion composed of preliminarily formed submicron particles is prepared by polymerization in the first step, and a monomer is added to the seed dispersion and polymerized in the second step so that a desired polymer concentration is obtained. Still further, another polymer polyol also is known that is obtained by a production method in which particles are obtained by using preliminarily-formed submicron particles as nuclei (see Patent Document 2).
Patent Document 1: JP 6(1994)-172462 A
Patent Document 2: JP 9(1997)-309937 A

DISCLOSURE OF INVENTION

Problem to be Solved by the Invention

If the polymer polyol obtained by the method of Patent Document 1 is used, however, the following problem occurs: if it is used for forming a slabstock foam, scorching tends to occur owing to a high ratio of acrylonitrile in the polymer particles. Further, in the case of a polymer polyol obtained by the method according to Patent Document 2, the following problem occurs: because a large amount of a so-called coupled polyol, which is a high-molecular-weight polyol obtained by coupling polyols with use of isocyanate, is used in a polyol that serves as a polymerization site so that particles have a smaller particle diameter, the polymer polyol has a high viscosity, and an obtained polyurethane resin (e.g. polyurethane foam) has insufficient mechanical properties (elongation at break, etc.).

It is an object of the present invention to solve the above-described problems, and to provide a polymer polyol that contains polymer particles having a sufficiently small diameter and has a low viscosity, and with which a polyurethane resin having excellent mechanical strengths such as elongation at break can be produced; to provide a method for producing the foregoing polymer polyol; and to provide a method for producing a polyurethane resin that is formed of the above-described polymer polyol and that has excellent mechanical strengths such as elongation at break.

Means for Solving Problem

More specifically, the present invention includes the following three aspects.

[First Aspect] A polymer polyol (I) comprising:
  a polyol (A);
  polymer particles (B) obtained by polymerization of an ethylenically unsaturated compound (b); and
  an active-hydrogen-containing compound (d) having an aromatic ring and having a number-average molecular weight of 150 to 2,000,
    wherein a content of (d) is 1 to 20% on the basis of a weight of (B).
[Second Aspect] A method for producing a polymer polyol (I'),
    wherein an ethylenically unsaturated compound (b) is polymerized in a disperse medium containing a polyol (A), in the presence of an active-hydrogen-containing compound (d) having an aromatic ring and having a number-average molecular weight of 150 to 2,000, and in the presence of a dispersant (D) as required.
[Third Aspect] A method for producing a polyurethane resin, comprising
  causing a polyol component and a polyisocyanate component to react with each other,
    wherein the polymer polyol (I) and/or (I') according to the above-described aspect is used as at least a part of the polyol component.

Effects of the Invention

The polymer polyol of the present invention contains polymer particles having sufficiently small particle diameter, and the polyurethane resin of the present invention in which this polymer polyol is used has excellent mechanical strengths such as elongation at break. Further, the polymer polyol of the present invention has a low viscosity.

Further, the production method of the present invention makes it possible to obtain a polymer polyol that contains polymer particles having sufficiently small particle diameters and that has a low viscosity, and the polyurethane resin of the present invention formed of this polymer polyol has excellent mechanical strengths such as elongation at break.

DESCRIPTION OF THE INVENTION

In the present invention, a known polyol (e.g., those disclosed by JP 2007-191682 A and JP 2004-002800 A (corresponding to US 2005/245724 A1)) usually used for producing a polymer polyol may be used as the polyol (A). Examples of the polyol (A) include compounds (a1) having a structure obtained by adding alkylene oxide to a compound having at least 2 (preferably 2 to 8 from the viewpoint of the physical properties of the polyurethane resin) active hydrogen atoms (polyhydric alcohols, polyhydric phenols, amines, polycarboxylic acids, phosphoric acids, etc.), and mixtures of these. Among these, preferred are compounds having a structure obtained by adding alkylene oxide to a polyhydric alcohol, from the viewpoint of the productivity for the production of polyurethane.

Examples of polyhydric alcohols include dihydric alcohols having 2 to 20 carbon atoms (aliphatic diols, for instance, alkylene glycols such as ethylene glycol, propylene glycol, 1,3- or 1,4-butanediol, 1,6-hexanediol, and neopentylglycol; and alicyclic diols, for instance, cycloalkylene glycols such as cyclohexanediol and cyclohexanedimethanol); trihydric alcohols having 3 to 20 carbon atoms (aliphatic triols, for instance, alkane triols such as glycerol, trimethylolpropane, trimethylolethane, and hexanetriol); polyhydric alcohols having 4 to 8 or more hydroxyl groups and 5 to 20 carbon atoms (aliphatic polyols, for instance, alkane polyols such as pentaerythritol, sorbitol, mannitol, sorbitan, diglycerol, and dipentaerythritol, and intramolecular or intermolecular dehydration products of alkane polyols or alkane triols; and saccharides such as sucrose, glucose, mannose, fructose, and methylglucoside, and derivatives of the saccharides).

Examples of the amines include ammonia; and aliphatic amines such as alkanol amines having 2 to 20 carbon atoms (e.g. monoethanolamine, diethanolamine, isopropanolamine and aminoethylethanolamine), alkyl amines having 1 to 20 carbon atoms (e.g. n-butylamine and octylamine), alkylene diamines having 2 to 6 carbon atoms (e.g. ethylenediamine, propylenediamine and hexamethylenediamine), and polyalkylene polyamines (dialkylenetriamine, trialkylenetriamine, tetraalkylenepentamine, pentaalkylenehxamine, and hexaalkyleneheptamine in each of which an alkylene group has 2 to 6 carbon atoms, such as diethylenetriamine, and triethylenetetramine).

Examples of the amines further include aromatic mono- or polyamines having 6 to 20 carbon atoms (e.g. aniline, phenylenediamine, tolylenediamine, xylylenediamine, diethyl toluenediamine, methylenedianiline, and diphenyletherdiamine); alicyclic amines having 4 to 20 carbon atoms (isophoronediamine, cyclohexylenediamine and dicyclohexylmethanediamine); and heterocyclic amines having 4 to 20 carbon atoms (e.g. aminoethylpiperazine).

Examples of the polycarboxylic acids include aliphatic polycarboxylic acids having 4 to 18 carbon atoms (e.g. succinic acid, adipic acid, sebacic acid, glutaric acid, and azelaic acid), aromatic polycarboxylic acids having 8 to 18 carbon atoms (e.g. terephthalic acid and isophthalic acid), and mixtures of two or more of these.

As the alkylene oxide added to the active-hydrogen-containing compound, alkylene oxides having 2 to 8 carbon atoms are preferred, from the viewpoint of the physical properties of the polyurethane resin. Examples of such alkylene oxides include ethylene oxide (hereinafter abbreviated as EO), propylene oxide (hereinafter abbreviated as PO), 1,2-, 1,3-, 1,4-, and 2,3-butylene oxides (hereinafter abbreviated as BO), styrene oxide (hereinafter abbreviated as SO), and the like, and combinations of two or more of these (block addition and/or random addition). Preferably, PO or a combination of PO and EO (containing not more than 25% of EO) is used, from the viewpoint of the physical properties of the polyurethane resin. It should be noted that "%" hereinbefore and hereinafter refers to "percent by weight (wt %)" unless otherwise provided.

Specific examples of the polyol include known polyols (e.g., those disclosed by JP 2007-191682 A and JP 2004-002800 A (corresponding to US 2005/245724 A1)), which include an adduct obtained by adding PO to the above-described active-hydrogen-containing compound; an adduct obtained by adding PO and other alkylene oxide (hereinafter abbreviated as AO), preferably AO, to the active-hydrogen-containing compound in a manner as described below; or an esterification product of such an adduct compound with a polycarboxylic acid or a phosphoric acid:

(1) block addition of PO-AO in this order;
(2) block addition of PO-AO-PO-AO in this order;
(3) block addition of AO-PO-AO in this order;
(4) block addition of PO-AO-PO in this order;
(5) random addition of mixed PO and AO; or
(6) random addition or block addition according to the order described in the specification of U.S. Pat. No. 4,226,756.

Furthermore, from the viewpoint of the physical properties of the polyurethane resin, a hydroxyl equivalent of (a1) preferably is 200 to 4,000, more preferably 400 to 3,000. Two or more types of (a1) in combination having a total hydroxyl equivalent in the foregoing range preferably are used as well.

Further, examples of the polyol (A) also include other polyols (a2) and mixtures of the same.

As the polyol (A), a combination of (a1) and another polyol (a2) may be used. In this case, the ratio (by weight) of (a1)/(a2) used preferably is 100/0 to 80/20, from the viewpoint of the physical properties of the polyurethane resin.

Examples of the polyol (a2) include known polyols (those disclosed by JP 2007-191682 A and JP 2004-002800 A (corresponding to US 2005/245724 A1), etc.), and include the following polymer polyols: polyester polyols; diene-type polyols; hydrogenated products of the same; hydroxyl-group-containing vinyl polymers; natural-oil-type polyols; and denatured products of natural-oil-type polyols. Examples of the same also include mixtures of these.

Examples of the polyester polyols include:

condensation reaction products of the above described polyhydric alcohols and/or polyether polyols with the above described polycarboxylic acids or anhydrides thereof, or ester-forming derivatives of lower alkyl (the number of carbon atoms in the alkyl group: 1 to 4) esters thereof (e.g. adipic acid, sebacic acid, maleic anhydride, phthalic anhydride, dimethyl terephthalate, etc.), wherein the above described polyhydric alcohols and/or polyether polyols are, for example, dihydric alcohols such as ethylene glycol, diethylene glycol, propylene glycol, 1,3- or 1,4-butanediol, 1,6-hexanediol, and neopentylglycol; mixtures of these dihydric alcohols with polyhydric alcohols having three or more hydroxyl groups, such as glycerol and trimethylol propane; and low-mole (1 to 10 moles) alkylene oxide adducts of these polyhydric alcohols;

condensation reaction products of the above-described polyhydric alcohols and/or polyether polyols with the above-described carboxylic anhydride and alkylene oxide;

alkylene oxide (EO, PO, etc.) adducts of the above-described condensation reaction products;

polylactone polyols, for instance, a product obtained by ring-opening polymerization of a lactone (s-caprolactone, etc.) by using the above-described polyhydric alcohol as an initiator; and polycarbonate polyols, for instance, a reaction product of the above-described polyhydric alcohol and alkylene carbonate.

Examples of the other polyols further include diene-type polyols such as polybutadiene polyol, and hydrogenate products of the same; hydroxyl-group-containing vinyl polymers such as acrylic polyols; polyols based on a natural oil, such as castor oil; and modification products of natural-oil-type polyols.

Such a polyol (a2) usually has 2 to 8 hydroxyl groups, and from the viewpoint of the physical properties of the polyurethane resin, preferably 3 to 8 hydroxyl groups. Such a polyol (a2) also has a hydroxyl equivalent of usually 500 to 4,000, and from the viewpoint of the physical properties of the polyurethane resin, preferably 700 to 3,000.

The number-average molecular weight (according to gel permeation chromatography (GPC); this also applies to the number-average molecular weights described below unless otherwise specified particularly) of the polyol (A) preferably is not less than 1,500, more preferably 1,500 to 15,000, particularly preferably 1,800 to 12,000, and most preferably 2,000 to 9,000. It is preferable that the number-average molecular weight of the polyol (A) is not less than 1,500, from the viewpoint of the foaming property of the produced polyurethane foam. Furthermore, when the number-average molecular weight of (A) is not more than 15,000, the viscosity of the polyol (A) is low, which is preferable from the aspect of the handleability of the fine-particle-dispersed polyol. Furthermore, the polyol (A) preferably has a hydroxyl equivalent of 500 to 4000, and more preferably 700 to 3000, from the viewpoint of the physical properties of the polyurethane resin.

Examples of the ethylenically unsaturated compound (b) used in the present invention include unsaturated nitriles (b1), aromatic-ring-containing monomers (b2), (meth)acrylic acid esters (b3), polyoxyalkylene ethers (b4) of unsaturated compounds having hydroxyl groups, other ethylenically unsaturated compounds (b5), and mixtures of two or more of these.

It should be noted that the expression of " . . . (meth)acryl . . . " means " . . . acryl . . . and/or . . . methacryl . . . ", and this expression also is used hereinafter.

Examples of (b1) include acrylonitrile, and methacrylonitrile.

Examples of (b2) include styrene, α-methyl styrene, hydroxystyrene, and chlorostyrene.

Examples of (b3) include those composed of atoms of C, H, and O exclusively, for example: alkyl (meth)acrylate (the number of carbon atoms in the alkyl group: 1 to 24) such as methyl (meth)acrylate, butyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, octadecyl (meth)acrylate, eicosyl(meth)acrylate and docosyl(meth)acrylate; and hydroxypolyoxyalkylene mono(meth)acrylates (the number of carbon atoms in the alkylene group: 2 to 8).

Examples of (b4) include alkylene oxide adducts of α-alkenyl-group-containing compounds and alkylene oxide adducts of unsaturated esters having hydroxyl groups. Examples of the alkylene oxide adduct of an α-alkenyl-group-containing compound include alkylene oxide adducts of terminal-unsaturated alcohol having 3 to 24 carbon atoms. Examples of the terminal-unsaturated alcohol include allyl alcohol, and 1-hexene-3-ol. Examples of an AO adduct of unsaturated ester having a hydroxyl group include AO adducts of unsaturated esters having hydroxyl groups having 3 to 24 Cs. Examples of an unsaturated compound having a hydroxyl group include hydroxyethyl (meth)acrylate, and hydroxypropyl (meth)acrylate. From the viewpoint of the polymer particle stability, alkylene oxide adducts of allyl alcohols, and AO adducts of hydroxyalkyl (meth)acrylate (hydroxyalkyl having 2 to 12 Cs) are preferable.

It should be noted that in the foregoing, for example, "3 to 24 Cs" means that the number of carbon atoms is 3 to 24, and similar descriptions hereinafter have similar meanings.

The number of oxyalkylene units in (b4) preferably is 1 to 9 from the viewpoint of the polymer particle stability, more preferably 1 to 5, and further preferably 1 to 3. Examples of the alkylene oxide include those mentioned as alkylene oxides to be added to the active-hydrogen-containing compounds in the section of the polyol (a). From the viewpoint of the polymer particle stability, preferably, the alkylene oxide is PO and/or EO.

The number-average molecular weight of (b4) preferably is 170 to 480, more preferably 180 to 450, particularly preferably 182 to 420, and most preferably 185 to 400. When the number-average molecular weight is not less than 170, the polymer polyol has a lower viscosity, which is preferable from the viewpoint of the handleability, and also a polyurethane resin obtained using the same has excellent hardness. When the number-average molecular weight of (b4) is not more than 480, a polyurethane resin obtained using the same is excellent in hardness.

The number of unsaturated groups in (b4) may be at least one on average. From the viewpoint of the viscosity of the polymer polyol and the physical properties of the polyurethane resin, the number of unsaturated groups preferably is one to ten, more preferably one to two, and particularly preferably one.

Examples of the ethylenically unsaturated monomer (b5) other than those described above include (meth)acrylamide; vinyl-group-containing carboxylic acids such as (meth)acrylic acid, and derivatives of the same; aliphatic hydrocarbon monomers such as ethylene and propylene; fluorine-containing vinyl monomers, such as perfluorooctylethyl methacrylate and perfluorooctylethyl acrylate; nitrogen-containing vinyl monomers other than those described above, such as diaminoethyl methacrylate and morpholinoethyl methacrylate; vinyl-modified silicone; and cyclic olefin compounds, such as norbornene, cyclopentadiene, and norbornadiene.

Further, a small amount of a multifunctional monomer (b6) having two or more functional groups, other than those described above, may be used in (b), whereby the dispersion stability of the polymer polyol can be improved further. Examples of the multifunctional monomer include divinylbenzene, ethylene di(meth)acrylate, polyalkylene oxide glycol di(meth)acrylate, pentaerythritol triallyl ether, trimethylolpropane tri(meth)acrylate, ester of an unsaturated carboxylic acid and a glycol, the ester having a number-average molecular weight of not less than 500, and ester of an unsaturated alcohol and a carboxylic acid, the ester having a number-average molecular weight of not less than 500, as described in WO 01/009242.

In the present invention, the respective ratios by weight of (b1), (b2), (b3), (b4), (b5), and (b6) in (b) are not limited particularly, and an excellent polymer polyol (I) can be obtained according to the present invention, irrespective of the composition of monomer. The ratio however may be adjusted appropriately according to the required physical properties of a polyurethane to be obtained, and the like.

The content (wt %) of the unsaturated nitrile (b1) (particularly, acrylonitrile) preferably is not more than 50 wt %, and more preferably 15 to 40 wt %, on the basis of the weight of (b), from the viewpoint of the resistance to scorching.

With a view toward decreasing the particle diameter of polymer fine particles in (I), the content (wt %) of the aromatic-ring-containing monomer (b2) (particularly, styrene) preferably is not more than 99.5 wt %, more preferably 20 to 90 wt %, and particularly preferably 35 to 80 wt %, on the basis of the weight of (b).

The contents (wt %) of monomers in (b) other than those described above are as follows on the basis of the weight of (b), from the viewpoint of the physical properties of the polyurethane resin: the content of (b3) preferably is 0 to 30 wt %, and more preferably 0 to 20 wt %; the content of (b4) preferably is 0 to 10 wt %, and more preferably 0 to 5 wt %; the content of (b5) preferably is 0 to 10 wt %, and more preferably 0 to 5 wt %; and the content of (b6) preferably is 0.01 to 0.7 wt %, and more preferably 0.05 to 0.4 wt %.

The polymer particles (B) in the present invention are polymer particles obtained by polymerization of the ethylenically unsaturated compound (b).

The shape of each polymer particle (B) is not limited particularly, and the polymer particles (B) may have any shape such as a spherical shape, a spheroidal shape, or a flat shape. The shape however preferably is a spherical shape, from the viewpoint of the mechanical properties of the polyurethane.

The polymer particles (B) have a volume-average particle diameter (μm) of preferably 0.2 to 1.5 μm, more preferably 0.25 to 1.2 µm, and particularly preferably 0.3 to 1.1 µm, from the viewpoint of the viscosity of the polymer polyol and the physical properties of polyurethane. It should be noted that the volume-average particle diameter is measured by a method described later.

From the viewpoint of the particle diameter of the polymer particles in the polymer polyol, the active-hydrogen-containing compound (d) having an aromatic ring has a number-average molecular weight of 150 to 2,000, preferably 300 to 1,700, and more preferably 500 to 1,600. If the number-average molecular weight is less than 150 or more than 2,000, the polymer particles have a larger volume-average particle diameter.

Examples of the aromatic ring include aromatic rings in which a ring is formed with carbon atoms alone (benzene ring, naphthalene ring, etc.); and aromatic rings in which a ring is formed with carbon and nitrogen atoms (pyridine ring, etc.).

The content (wt %) of the aromatic ring in (d) preferably is 4 to 90 wt %, more preferably 8 to 70 wt %, and further more preferably 10 to 50 wt %, from the viewpoint of the volume-average particle diameter of the polymer particles. It should be noted that the "content of aromatic rings" means a value obtained by dividing a total atomic weight of elements forming a ring structure by a molecular weight.

From the viewpoint of the volume-average particle diameter of the polymer particles, the number of active hydrogen atoms in (d) preferably is 1 to 3, and more preferably 1 to 2, per one molecule of (d).

Further, (d) preferably has an active hydrogen equivalent (i.e., a molecular weight of (d) per active hydrogen) of 100 to 2,000, more preferably 150 to 1,700, and further more preferably 250 to 1,600, from the viewpoint of the volume-average particle diameter of the polymer particles.

Examples of (d) include aromatic-ring-containing ethers (d1), aromatic-ring-containing esters (d2), and aromatic-ring-containing urethanes (d3).

Examples of (d1) include compounds obtained by adding an alkylene oxide to a phenol such as bisphenol. Examples of phenol include monovalent phenols (cresol, naphthol, monostyrenated phenol, etc.); divalent phenols (catechol, resorcinol, bisphenol, etc.); and trivalent or higher phenols (pyrogallol, etc.).

Examples of (d2) include compounds obtained by adding an alkylene oxide to an aromatic-ring-containing carboxylic acid such as phthalic acid. Examples of the aromatic-ring-containing carboxylic acid include monovalent carboxylic acids (benzoic acid, salicylic acid, etc.); divalent carboxylic acids (phthalic acid, terephthalic acid, etc.); and trivalent or higher carboxylic acids (mellitic acids, etc.).

Examples of (d3) include compounds obtained by polycondensation of an aromatic isocyanate such as 2,4- and/or 2,6-tolylene diisocyanate (TDI) and a polyol. Examples of an aromatic isocyanate include monovalent isocyanates (phenyl isocyanate, etc.); divalent isocyanates (tolylene diisocyanate, 2,4'- and/or 4,4'-diphenylmethane diisocyanate (MDI), xylylene diisocyanate, etc.); and trivalent or higher isocyanates (triphenylmethane triisocyanate, tris(isocyanatephenyl) thiophosphate, polymeric MDI, etc.).

Among these, (d1) is preferred, from the viewpoint of the viscosity of (d) and the viscosity of the polymer polyol.

Further, (d) preferably is an alkylene oxide adduct (d-1) of an active-hydrogen-containing compound (e) having one or more active hydrogen atoms and having a hydroxyl equivalent and an SP value satisfying Formula (1) and Formula (2) shown below, respectively:

$$80 \leq X \leq 360 \quad (1)$$

$$-0.012 \times X + 14.0 \leq S \leq -0.012 \times X + 17.0 \quad (2)$$

where X represents the hydroxyl equivalent of the active-hydrogen-containing compound (e), and S represents the SP value of the active-hydrogen-containing compound (e).

$$90 \leq X \leq 360 \quad (1')$$

$$-0.012 \times X + 14.0 \leq S \leq -0.012 \times X + 16.0 \quad (2')$$

$$95 \leq X \leq 340 \quad (1'')$$

$$-0.012 \times X + 14.1 \leq S \leq -0.012 \times X + 15.8 \quad (2'')$$

$$110 \leq X \leq 310 \quad (1''')$$

$$-0.012 \times X + 14.4 \leq S \leq -0.012 \times X + 15.7 \quad (2''')$$

From the viewpoint of the viscosity of (d) and the particle diameter of the polymer particles in the polymer polyol, the hydroxyl equivalent (X) of the active-hydrogen-containing compound (e) preferably satisfies Formula (1), more preferably satisfies Formula (1'), particularly preferably satisfies Formula (1''), and most preferably satisfies Formula (1''').

Further, from the viewpoint of the particle diameter of the polymer particles in the polymer polyol and mechanical properties of the polyurethane resin, the relationship between the SP value and the hydroxyl equivalent of the active-hydrogen-containing compound (e) preferably satisfies Formula (2), more preferably satisfies Formula (2'), particularly preferably satisfies Formula (2''), and most preferably satisfies Formula (2''').

The SP value is expressed by the square root of the ratio of a cohesive energy density to a molar volume as follows:

$$[SP\ \text{value}] = (\Delta E/V)^{1/2}$$

In the above equation, ΔE indicates a cohesive energy density, and V indicates a molecular volume. The values of ΔE and V are determined by the calculation of Robert F. Fedors et al., which is described, for example, in *Polymer Engineeng and Science*, Volume 14, pages 147 to 154.

The hydroxyl equivalent (X) is a value that varies with the number of hydroxyl groups possessed by the active-hydrogen-containing compound (e) and the molecular weight of (e), and a certain active-hydrogen-containing compound (e) having a specific number of hydroxyl groups and a specific molecular weight may be selected so that Formula (1) is satisfied.

In order that X and S satisfy Formula (2), adjustment may be made as to the number of structures that cause the SP value to increase or the number of functional groups that cause the SP value to increase, and the number of structures that cause the SP value to decrease or the number of functional groups that cause the SP value to decrease, such structures or functional groups being those other than the hydroxyl groups in (e). For example, when S is smaller than the lower limit of Formula (2), the number of structures having SP values greater than 10 or the number of functional groups having SP values greater than 10 may be increased, or the number of structures having SP values smaller than 10 or the number of functional groups having SP values smaller than 10 may be decreased, whereby adjustment may be made so that Formula (2) should be satisfied. When S is greater than the upper limit of Formula (2), the number of structures having SP values greater than 12 or the number of functional groups having SP values greater than 12 may be decreased, or the number of structures having SP values smaller than 12 or the number of functional groups having SP values smaller than 12 may be increased, whereby adjustment may be made.

That the hydroxyl equivalent (X) satisfies Formula (1) means that (e) contains appropriate amounts of hydroxyl groups, i.e., functional groups to which alkylene oxides can be added, and means that (d) having a structure in which alkylene oxides are added to the hydroxyl groups has an appropriate affinity with the polyol (A).

Further, that the hydroxyl equivalent (X) and the SP value (S) of (e) satisfy Formula (2) means that (e) has an appropriate SP value according to an amount of hydroxyl groups (i.e., functional groups to which alkylene oxides can be added) that (e) possesses. In other words, this means that (d) having a structure in which alkylene oxides are added to (e) satisfying this relationship has appropriate affinity with the polymer particles (B) according to the affinity with the polyol (A).

Therefore, (d) having a structure in which alkylene oxides are added to (e) satisfying Formulae (1) and (2) has appropriate affinity with the polyol (A) and appropriate affinity with the polymer particles (B), and the balance therebetween is appropriate, which means that (d) has superior dispersibility of polymer particles.

The number of active hydrogen atoms in (e) preferably is 1 to 3, and more preferably 1 to 2, per one molecule of (e), from the viewpoint of the particle diameter of the polymer particles (B).

The active-hydrogen equivalent of (e) (i.e., the molecular weight of (e) per one active hydrogen atom) preferably is 60 to 500, more preferably 80 to 450, and further more preferably 100 to 400, from the viewpoint of the particle diameter of the polymer particles.

Examples of (e) include the same phenols as those mentioned regarding (d1) above, including bisphenol (e1), and styrenated phenol (e2).

Examples of (e1) include bisphenols, and examples of (e2) include monostyrenated phenols and distyrenated phenols.

Among these, (e1) is preferred from the viewpoint of the viscosity of (d) and the particle diameter of the polymer particles in the polymer polyol.

As alkylene oxides, the same as those mentioned above can be used, and those preferred also are the same as those mentioned above.

Examples of the alkylene oxide adduct (d-1) of the active-hydrogen-containing compound (e) that has one or more active hydrogen atoms and that has a hydroxyl equivalent and an SP value satisfying Formula (1) and Formula (2) include, specifically, bisphenol alkylene oxide adducts (d-1-1), and styrenated phenol alkylene oxide adducts (d-1-2).

Examples of (d-1-1) include compounds obtained by adding alkylene oxides to bisphenols, and examples of (d-1-2) include compounds obtained by adding alkylene oxides to monostyrenated phenols.

Among these, (d-1-1) are preferred from the viewpoint of the viscosity of (d) and the particle diameter of polymer particles in the polymer polyol.

The content of (d) preferably is 1 to 20 wt %, more preferably 1 to 15 wt %, further more preferably 1 to 10 wt %, still further more preferably 2 to 10 wt %, and particularly preferably 3 to 10 wt % on the basis of the weight of (B), from the viewpoint of the volume-average particle diameter of the polymer particles and the mechanical properties of the polyurethane resin. If the content of (d) is less than 1 wt %, the volume-average particle diameter of the polymer particles is large, whereas if it exceeds 20 wt %, the mechanical properties of the urethane resin are impaired.

As to the polymer polyol (I) of the present invention, the relationship between a content (PC) of the polymer particles (B) in (I) and a coefficient of viscosity (N1) of (I) at 25° C. at a shearing speed of 1.0 (1/s) measured by a rheometer preferably satisfies Formula (3) shown below, and more preferably satisfies Formula (3-1) shown below. It should be noted that the coefficient of viscosity is measured by a method described later.

$$(N1)<0.9\times(PC)-35 \quad (3)$$

$$(N1)<0.9\times(PC)-35.5 \quad (3-1)$$

Alternatively, as to the polymer polyol (I) of the present invention, the relationship between the content (PC) of the polymer particles (B) in (I) and a coefficient of viscosity (N2) of (I) at 25° C. at a shearing speed of 0.1 (1/s) measured by a rheometer, and the relationship between the foregoing content (PC) and a coefficient of viscosity (N3) thereof at 25° C. at a shearing speed of 10.0 (1/s) measured by a rheometer preferably satisfy Formulae (4) and (5) shown below, and more preferably satisfy Formulae (4-1) and (5-1) shown below. It should be noted that the viscosities are measured by a method described later.

$$(N2)<1.17\times(PC)-46 \quad (4)$$

$$(N2)<1.17\times(PC)-47 \quad (4-1)$$

$$(N3)<1.37\times(PC)-55 \quad (5)$$

$$(N3)<1.37\times(PC)-56 \quad (5-1)$$

It is preferable that the polymer polyol (I) of the present invention should satisfy all of the foregoing relationships expressed by Formulae (3), (4), and (5), or it also is preferable that (I) should satisfy only the relationship expressed by Formula (3), or should satisfy only the relationships expressed by Formulae (4) and (5). Among these cases, the case where all of the relationships expressed by Formulae (3), (4), and (5) are satisfied is preferred.

If none of the relationships expressed by Formulae (3), (4), and (5) is satisfied, the filtering properties of the polymer polyol are impaired.

The content (PC) (wt %) of the polymer particles (B) in the polymer polyol (I) preferably is 35 to 60 wt %, more preferably 40 to 55 wt %, and particularly preferably 40 to 50 wt %, from the viewpoint of physical properties of the polyurethane resin obtained from (I), for example, an elongation at break and a compression hardness of the polyurethane foam, and a viscosity of the polymer polyol.

The content (wt %) of the polyol (A) in the polymer polyol (I) preferably is 35 to 70, more preferably 40 to 65, particularly preferably 43 to 62, and most preferably 45 to 60, from the viewpoint of the prevention of aggregation of (B) and the mechanical properties of the polyurethane The weight ratio between the active-hydrogen-containing compound (d) and a dispersant (D) that will be described layer, that is, (d):(D), preferably is 1:30 to 20:1, more preferably 1:25 to 15:3, further more preferably 1:20 to 10:5, and particularly preferably 2:20 to 10:6, form the viewpoint of volume-average particle diameter of the polymer particles, the viscosity of the polymer polyol, and the mechanical properties of the urethane resin.

Examples of the method for producing the polymer polyol (I) of the present invention include the following production methods (1) and (2), and from the viewpoint of the production stability, the production method (1), which is the second aspect of the present invention, is preferred:

(1) a production method in which the ethylenically unsaturated compound (b) is polymerized in a disperse medium containing the polyol (A), in the presence of the active-hydrogen-containing compound (d), and in the presence of the dispersant (D) as required; and (2) a production method in which the ethylenically unsaturated compound (b) is polymerized to form the polymer particles (B), and thereafter the polymer particles (B) are dispersed in the polyol (A), in the presence of the active-hydrogen-containing compound (d), and in the presence of the dispersant (D) as required.

The production method (1) described above is a method in which the ethylenically unsaturated compound (b) is polymerized in a disperse medium containing the polyol (A), in the presence of the active-hydrogen-containing compound (d), and in the presence of the dispersant (D) as required, and this method is the second aspect of the present invention. It should be noted that a polymer polyol obtained by the production method of the second aspect is referred to as "polymer polyol (I')".

Examples of the polymerization method include radical polymerization, coordinated anionic polymerization, metathesis polymerization, and Diels-Alder polymerization. Among these, radical polymerization is preferred from the industrial viewpoint.

The radical polymerization can be performed by various methods, such as a method in which, in the polyol (A) containing the active-hydrogen-containing compound (d), as well as a dispersant (D) as required, the ethylenically unsaturated compound (b) is polymerized in the presence of a radical polymerization initiator (K) (e.g., the method described in U.S. Pat. No. 3,383,351).

As the radical polymerization initiator (K), a compound that forms a free radical to initiate polymerization may be used. Examples of the same include known radical polymerization initiators (those described in JP 2007-191682 A, JP 2004-002800 A (corresponding to US 2005/245724 A1), etc.), and azo compounds, peroxides, and the like (those described in, for example, JP 2005-162791 A, and JP 2004-002800 A (corresponding to US 2005/245724 A1)) can be used. Examples of such a compound include the following:

azo compounds such as 2,2'-azobisisobutyronitrile, 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methyl propionate), 2,2'-azobis[2-(hydroxymethyl)propionitrile] and 1,1'-azobis(1-acetoxy-1-phenylethane);

organic peroxides such as dibenzoyl peroxide, dicumyl peroxide, bis(4-t-butylcyclohexyl)peroxidicarbonate, benzoyl peroxide, lauroyl peroxide and persuccinic acid; and inorganic peroxides, such as persulfates and perborates.

Two or more of these may be used in combination.

The used amount of the radical polymerization initiator (K) preferably is 0.05 to 20 wt %, more preferably 0.1 to 5 wt %, and particularly preferably 0.2 to 1.5 wt %, on the basis of the weight of (b). When the used amount of (K) is in this range, the polymerization degree of (b) in the polymer polyol is sufficiently high, and also the molecular weight is high. Thus, this configuration is excellent in that a polyurethane foam obtained therefrom has a sufficient foam compressive hardness and an elongation at break.

The dispersant (D) is not limited particularly, and various known dispersants used in a polymer polyol (e.g., those described in JP 2005-162791 A, JP 2004-002800 A (corresponding to US 2005/245724 A1) and the like), etc. can be used as the dispersant (D). Examples of (D) include reactive dispersants having an ethylenically unsaturated group copolymerizable with (b), and non-reactive dispersants that are not copolymerizable with (b).

Examples of the dispersant (D) include:

[1] macromer-type dispersants obtained by causing a polyol to react with an ethylenically unsaturated compound, such as an ethylenically unsaturated group-containing modified polyether polyol (e.g., JP 08 (1996)-333508 A);

[2] graft-type dispersants obtained by combining a polyol with an oligomer, such as a graft polymer that has, as side chains, two or more segments with affinity with a polyol, and that has, as a main chain, a segment with affinity with a polymer formed from an ethylenically unsaturated compound, in which the difference between the solubility parameter of the side chains and the solubility parameter of the polyol is not more than 1.0, and the difference between the solubility parameter of the main chain and the solubility parameter of the polymer is not more than 2.0 (e.g., JP 05(1993)-059134 A);

[3] high-molecular-weight polyol type dispersants, e.g. a modified polyol obtained by causing at least a portion of the hydroxyl groups in a polyol to react with a methylene dihalide and/or an ethylene dihalide to increase its molecular weight (e.g., JP 07(1995)-196749 A);

[4] oligomer type dispersants, e.g. a vinyl oligomer with a number-average molecular weight of 1,000 to 1,000,000 at least a portion of which is soluble in polyols, and a dispersant comprising this oligomer and the ethylenically unsaturated group-containing modified polyether polyol described for [1] above in combination (e.g., JP 09(1997)-77968 A) (including (D1) that will be described later); and

[5] reactive dispersants, such as a dispersant comprising a nitrogen-bond-containing unsaturated polyol obtained by combining a polyol and a monofunctional active hydrogen compound via polyisocyanate, the monofunctional active hydrogen compound having at least one ethylenically unsaturated group (e.g., those disclosed in JP 2002-308920 A (corresponding to U.S. Pat. No. 6,756,414), etc.) (including (D2) that will be described later).

Among these, the types [1], [4], and [5] are preferred, from the viewpoint of the particle diameter of the polymer particles (B), and (D1) and (D2) described below are preferred more:

(D1) vinyl oligomer having a number-average molecular weight of 1,000 to 1,000,000; and (D2) unsaturated polyol having a nitrogen-containing bond, the polyol being formed by bonding a saturated polyol (f) with a monofunctional active hydrogen containing compound (g) having at least one ethylenically unsaturated group via a polyisocyanate (h), wherein an average value of a ratio of the number of unsaturated groups to the number of nitrogen-containing bonds originating from an NCO group in one molecule of the polyol is 0.1 to 0.4.

(D1) is a vinyl oligomer obtained by polymerization of an ethylenically unsaturated compound. As the ethylenically unsaturated compound that composes (D1), the same material as the above-described ethylenically unsaturated compound (b) can be used.

In these, at least a part of the ethylenically unsaturated compound that composes (D1) preferably is the same as the ethylenically unsaturated compound (b) that composes the polymer particles, from the viewpoint of the particle diameter of the polymer particles (B); more preferably 30 wt % or more of the ethylenically unsaturated compound that composes (D1) is the same as (b); and further more preferably 70 wt % or more, and particularly preferably 80 wt % or more, is the same as (b).

From the viewpoint of the particle diameter of the polymer particles, the number-average molecular weight (hereinafter abbreviated as "Vin") of (D1) has a weight-average molecular weight in terms of polystyrene measured by gel permeation chromatography (GPC) of 1,000 to 1,000,000, preferably 100,000 to 950,000, further preferably 150,000 to 900,000, and particularly preferably 200,000 to 250,000. Further, from the viewpoint of the particle diameter of the polymer particles, (D1) desirably has a solubility with respect to the polyol (A) [transmittance of laser light through a homogeneous mixture of (D1) and (A), (D1) being 5 wt % based on the total weight of (D1) and (A) is 10% or more].

It should be noted that Mn of (D1) is determined by the following method.

About 5 g of a polymer polyol is weighed precisely in a 50-ml centrifuge tube, and this is diluted with 50 g of methanol added thereto. Using a refrigerated centrifuge [model: H-9R, manufactured by Kokusan Co., Ltd.], centrifugation is performed at 20° C., 18,000 rpm for 60 minutes. Supernatant fluid is removed with a glass pipette. Operations of diluting the residual sediment with 50 g of methanol added thereto, subjecting the solution to the same centrifugation, and removing supernatant fluid in the same manners as those described above are repeated three more times. The residual sediment in the centrifuge tube is dried under a reduced pressure of 2,666 to 3,999 Pa (20 to 30 torr), at 60° C., for 60 minutes, whereby dried sediment is obtained. A number-average molecular weight of this sediment in terms of polystyrene by gel permeation chromatography (GPC) is determined, which is assumed to be Mn of (D1).

The production of (D1) can be performed by a usual method for polymerizing an ethylenically unsaturated compound, except that a polymerization degree is controlled so that the number-average molecular weight becomes 1,000 to 1,000,000. For example, it is a method in which an ethylenically unsaturated compound (b) is polymerized in a solvent as required, in the presence of a radical polymerization initiator (K) that will be described layer. Alternatively, (D1) may be a vinyl oligomer obtained by polymerization of (b) in the polyol (A), and in this case, the polymerization concentration preferably is 1 to 40 wt %, and more preferably 5 to 20 wt %. The vinyl oligomer obtained by this polymerization may be used in the production of a polymer polyol, without being subjected to a purifying process. The radical polymerization initiator is used in a relatively large amount, for example, preferably 2 to 30 wt %, or more preferably 5 to 20 wt %, on the basis of the total weight of ethylenically unsaturated compounds.

Examples of the solvent used as required in the foregoing polymerization reaction include benzene, toluene, xylene, acetonitrile, ethyl acetate, hexane, heptane, dioxane, N,N-dimethyl formamide, N,N-dimethyl acetamide, isopropyl alcohol, and n-butanol.

Among these solvents, toluene, xylene, isopropyl alcohol, and n-butanol are preferred, from the viewpoint of the viscosity, and the mechanical strength of the polyurethane resin to be produced.

Additionally, the polymerization may be performed in the presence of a chain transfer agent as required. Examples of the chain transfer agent include alkylmercaptans (dodecyl mercaptan, mercaptoethanol, etc.); alcohols (isopropyl alcohol, methanol, 2-butanol, etc.); halogenated hydrocarbons (carbon tetrachloride, carbon tetrabromide, chloroform, etc.); and enol ethers disclosed in JP 55(1980)-31880 A. The polymerization may be either the batch polymerization type or the continuous polymerization type. The polymerization reaction may be performed at a temperature equal to or higher than a decomposition temperature of the radical polymerization initiator (normally 50° C. to 250° C., preferably 80° C. to 200° C., and particularly preferably 100° C. to 180° C.), and under an atmospheric pressure or an increased pressure.

The reactive dispersant (D2) is an unsaturated polyol having a nitrogen-containing bond, the polyol being as follows: the polyol is formed by bonding a saturated polyol (f) with a monofunctional active hydrogen compound (g) having at least one ethylenically unsaturated group via a polyisocyanate (h); and an average value of a ratio of the number of unsaturated groups to the number of nitrogen-containing bonds originating from an NCO group in one molecule of the polyol is 0.1 to 0.4.

As (f) that composes (D2), any one of those described above as the polyol (A) may be used. The polyol (f) and the polyol (A) may be identical or different.

The number of hydroxyl groups in one molecule of (f) is at least two, preferably two to eight, and more preferably three to four, from the viewpoint of the dispersion stability. The hydroxyl equivalent of (f) preferably is 1,000 to 3,000, more preferably 1,500 to 2,500, from the viewpoint of the dispersion stability.

The compound (g) used for obtaining (D2) is a compound having one active hydrogen-containing group and at least one polymerizable unsaturated group. Examples of the active hydrogen-containing group include a hydroxyl group, an amino group, an imino group, a carboxyl group, an SH group, etc., among which a hydroxyl group is preferred from the viewpoint of the polymer particle stability.

The ethylenically unsaturated group of (g) preferably is a polymerizable double bond from the viewpoint of the characteristic of being incorporated easily into a polymer composition, and the number of the ethylenically unsaturated groups in one molecule is one to three preferably, and particularly preferably one. More specifically, preferred as (g) is an unsaturated monohydroxy compound having one polymerizable double bond.

Examples of the foregoing unsaturated monohydroxy compound include, for instance, monohydroxy-substituted unsaturated hydrocarbons, monoesters of unsaturated monocarboxylic acids and dihydric alcohols, monoesters of unsaturated dihydric alcohols and monocarboxylic acids, phenols having alkenyl side chain groups, and unsaturated polyether monools.

Examples of the monohydroxy-substituted unsaturated hydrocarbon include alkenol having 3 to 6 Cs such as (meth)allyl alcohol, 2-butene-1-ol, 3-butene-2-ol, and 3-butene-1-ol; and alkynols, for instance, propargyl alcohol. It should be noted that the expression of "(meth)allyl . . . " in the foregoing means "allyl . . . and/or methallyl . . . ", and this expression is used also hereinafter.

Usable as the monoester of an unsaturated monocarboxylic acid and a dihydric alcohol is, for example, a monoester of an unsaturated monocarboxylic acid having 3 to 8 Cs (acrylic acid, methacrylic acid, chrotonic acid, or itaconic acid) and the above-described dihydric alcohol (a dihydric alcohol having 2 to 12 carbon atoms such as ethylene glycol, propylene glycol, or butylene glycol). Specific examples of the foregoing monoester include 2-hydroxy ethyl acrylate, 2-hydroxy ethyl methacrylate, 2-hydroxy propyl acrylate, 2-hydroxy propyl methacrylate, 2-hydroxy butyl acrylate, and 4-hydroxy butyl acrylate.

Usable as the monoester of an unsaturated dihydric alcohol and a monocarboxylic acid is, for example, a monoester of an unsaturated dihydric alcohol having 3 to 8 Cs and a monocarboxylic acid having 2 to 12 Cs, for instance, acetic acid monoester of butene diol.

Usable as the phenol having an alkenyl side chain group is, for example, a phenol having an alkenyl side chain group having 2 to 8 Cs in an alkenyl group, such as oxystyrene, hydroxy-α-methyl styrene, etc.

Usable as the unsaturated polyether monool is, for example, a 1 to 50-mole alkylene oxide (2 to 8 Cs) adduct of the monohydroxy-substituted unsaturated hydrocarbon or the phenol having the alkenyl side chain group [e.g. polyoxyethylene (polymerization degree: 2 to 10) monoallyl ether].

Examples of (g) other than the unsaturated monohydroxy compounds include the following.

Examples of (g) having an amino group or an imino group include mono- and di-(meth)allyl amines, amino alkyl (2 to 4 Cs) (meth)acrylates [amino ethyl (meth)acrylate, etc.]; and monoalkyl (1 to 12 Cs) amino alkyl (2 to 4 Cs) (meth)acrylates [monomethyl amino ethyl methacrylate, etc.]. Examples of (g) having a carboxyl group include the aforementioned unsaturated monocarboxylic acids. Examples of (g) having an SH group include compounds corresponding to the aforementioned unsaturated monohydroxy compounds (in which SH substitutes for OH). Examples of (g) having not less than two polymerizable unsaturated groups include poly(meth)allylethers of the aforementioned polyhydric alcohols having a valence of 3, 4 to 8, or more, and polyesters of the above alcohols with the aforementioned unsaturated carboxylic acids [e.g. trimethylol propane diallylether, pentaerythritol triallylether, glycerol di(meth)acrylate, etc.]

Among these compounds, preferred are the alkenols having 3 to 6 Cs, the monoesters of unsaturated monocarboxylic acids having 3 to 8 Cs and dihydric alcohols having 2 to 12 Cs, and the phenols having alkenyl side chain groups. Among these, more preferred are monoesters of (meth)acrylic acids with ethylene glycol, propylene glycol, or butylene glycol; allyl alcohol; and hydroxy α-methyl styrene. Among these, particularly preferred is 2-hydroxy ethyl (meth)acrylate.

Furthermore, though the molecular weight of (g) is not particularly limited, it preferably is not more than 1,000, and particularly preferably not more than 500, from the viewpoint of the viscosity of the polymer polyol.

The polyisocyanate (h) is a compound having at least two isocyanate groups, and examples of the same include aromatic polyisocyanates (h1), aliphatic polyisocyanates (h2), alicyclic polyisocyanates (h3), aralphatic polyisocyanates (h4), modification products of these polyisocyanates (modification products having a urethane group, a carbodiimide group, an allophanate group, a urea group, a biuret group, an isocyanurate group, or an oxazolidone group, etc.) (h5), and mixtures of two or more of these.

Examples of (h1) include aromatic diisocyanates having 6 to 16 Cs (excluding Cs contained in NCO groups; this applies to the polyisocyanates mentioned below), aromatic triisocyanates having 6 to 20 Cs, crude products of these isocyanates, and the like. More specifically, the examples include 1,3- and 1,4-phenylene diisocyanate, 2,4- and/or 2,6-tolylene diisocyanate (TDI), crude TDI, 2,4'- and/or 4,4'-diphenyl methane diisocyanate (MDI), crude MDI [phosgenated compound of crude diaminodiphenyl methane {a condensation product of formaldehyde with aromatic amine (aniline); a mixture of diaminodiphenyl methane as a main product and polyamine in a small amount (e.g. 5 to 20 wt %) having three or more functional groups as a by-product}: for instance, polyallyl polyisocyanate (PAPI)], naphthylene-1,5-diisocyanate, triphenyl methane-4,4',4"-triisocyanate, etc.

Examples of (h2) include aliphatic diisocyanates having 2 to 18 Cs. More specifically, the examples include 1,6-hexamethylene diisocyanate, 2,2,4-trimethylhexamethylene diisocyanate, lysine diisocyanate, etc.

Examples of (h3) include alicyclic diisocyanates having 4 to 16 Cs. More specifically, the examples include isophorone diisocyanate, 4,4'-dicyclohexyl methane diisocyanate, 1,4-cyclohexane diisocyanate, and norbornane diisocyanate.

Examples of (h4) include aralphatic diisocyanates having 8 to 15 Cs. More specifically, the examples include xylylene diisocyanate, and α,α,α',α'-tetramethyl xylylene diisocyanate.

Examples of (h5) include urethane-modified MDI, carbodiimide-modified MDI, sucrose-modified TDI, and castor oil-modified MDI.

Among these, aromatic diisocyanates are preferred from the viewpoint of the physical properties of the polyurethane resin, and 2,4- and/or 2,6-TDI is more preferred.

The nitrogen-containing bond of the reactive dispersant (D2) is generated by reaction of an isocyanate group with an active hydrogen-containing group. In the case where the active hydrogen-containing group is a hydroxy group, a urethane bond is generated principally. In the case where the group is an amino group, a urea bond is generated principally. An amide bond is generated in the case of a carboxyl group, while a thiourethane bond is generated in the case of a SH group. In addition to these groups, another bond, for instance, a biuret bond, an allophanate bond, etc., may be generated.

These nitrogen-containing bonds generally are classified into two kinds; those generated by reaction of a hydroxy group of the saturated polyol (f) with an isocyanate group of the polyisocyanate (h); and those generated by reaction of an active hydrogen-containing group of the unsaturated monofunctional active hydrogen compound (g) with an isocyanate group of (h).

The dispersant (D2) is obtained by causing (f), (g), and (h) to react at a ratio such that an average of a ratio of the number of unsaturated groups to the number of nitrogen-containing bonds originating from NCO groups in one molecule of (h) is 0.1 to 0.4. The average of the ratio is derived according to the following formula.

$$\text{Average of a ratio of the number of unsaturated groups to the number of nitrogen-containing bonds originating from NCO groups in one molecule of } (h) = \frac{\left[\begin{array}{c}\text{number of moles of } (g) \times \\ \text{number of unsaturated groups of } (g)\end{array}\right]}{\left[\begin{array}{c}\text{number of moles of } (h) \times \\ \text{number of NCO groups of } (h)\end{array}\right]}$$

The average of a ratio of the number of unsaturated groups to the number of nitrogen-containing bonds originating from NCO groups in one molecule of (h) more preferably is 0.1 to 0.3, and particularly preferably 0.2 to 0.3. In the case where the value of the average of the ratio of the unsaturated groups is in the foregoing range, the polymer polyol has particularly excellent dispersion stability.

Besides, from the viewpoint of the particle diameter of the polymer particles (B) and the viscosity of the polymer polyol to be obtained, the content of such (D), on the basis of the weight of (b), preferably is not more than 50 wt %, more preferably 1 to 40 wt %, further more preferably 1 to 30 wt %, particularly preferably 3 to 25 wt %, and most preferably 5 to 20 wt %.

As a method for producing the polymer polyol of the present invention, the use of the above-described active-hydrogen-containing compound (d) having a number-average molecular weight of 150 to 2,000 and having an aromatic ring is preferred particularly.

The used amount of (d) (wt %) preferably is 5 to 100 wt %, more preferably 10 to 100 wt %, and particularly preferably 20 to 100, on the basis of the total amount of (d) and the dispersant (D) used, from the viewpoint of the particle diameter of the polymer particles in the polymer polyol.

On the basis of the weight of (B), the used amount of (d) preferably is 1 to 20 wt %, more preferably 1 to 15 wt %, further more preferably 1 to 10 wt %, most preferably 2 to 10 wt %, and particularly preferably 3 to 10 wt %, from the viewpoint of the volume-average particle diameter of the polymer particles and the mechanical properties of the urethane resin.

It should be noted that, in the present invention, compounds equivalent to active-hydrogen-containing compounds (d) having an aromatic ring are not considered as a dispersant (D), but are considered as (d).

In the case where the active-hydrogen-containing compound (d) and the dispersant (D) are used in combination, the ratio by weight of (d) and (D), i.e., (d):(D), preferably is 1:30 to 20:1, more preferably 1:25 to 15:3, further more preferably 1:20 to 10:5, and particularly preferably 2:20 to 10:6, from the viewpoint of the volume-average particle diameter of the polymer particles, the viscosity of the polymer polyol, and the mechanical properties of the urethane resin.

In the radical polymerization, a diluent (C) may be used as required. Examples of the diluent (C) include aromatic hydrocarbons (having 6 to 10 carbon atoms; e.g., toluene, and xylene); saturated aliphatic hydrocarbons (having 5 to 15 carbon atoms; e.g. hexane, heptane, and normal decane); and other known solvents (e.g., those described in JP 2005-162791 A, JP2004-002800 A (corresponding to US 2005/245724 A1), etc.). Among these, aromatic hydrocarbon solvents are preferable.

The used amount of the diluent (C) preferably is not more than 50 wt %, and more preferably 1 to 40 wt %, on the basis of the total weight of (b), from the viewpoint of the viscosity of the polymer polyol and the prevention of aggregation of the polymer particles. The diluent (C) used may remain in the polymer polyol after the polymerization reaction ends, but desirably is removed by vacuum stripping or the like after the polymerization reaction from the viewpoint of the mechanical properties of the polyurethane.

Further, a chain transfer agent (P) may be used as required in the radical polymerization. As (P), various chain transfer agents can be used, such as aliphatic thiols (1 to 20 Cs; e.g., n-dodecane thiol, mercaptoethanol) (e.g., those described in JP 2005-162791 A, etc.).

The used amount of (P) preferably is not more than 2 wt %, and more preferably not more than 0.1 wt %, on the basis of the total weight of (b), from the viewpoint of the viscosity of the polymer polyol and the physical properties of the polyurethane resin.

Focusing on the polymerization step, the polymer polyol can be produced by a production method comprising a known step for producing a polymer polyol, such as a batch polymerization method and a continuous polymerization method (e.g., those described in JP 2005-162791 A, JP 8(1996)-333508 A, and JP 2004-002800 A (corresponding to US 2005/245724 A1)). As the step for obtaining the polymer polyol of the present invention, the batch polymerization method (including the multi-stage one-step polymerization method) or the continuous polymerization method is used preferably.

The multi-stage one-step polymerization method is a polymerization method including n polymerization steps (n is an integer of not less than 2), and includes the following steps (I) to (III). This production method may have any configuration as long as the steps (I) to (III) are carried out in this order, and these steps may be carried out in one reaction container, or different reaction containers, respectively:

(I) charging the ethylenically unsaturated compound (b), the polyol (A), and the active-hydrogen-containing compound (d), as well as the dispersant (D) and the diluent (C) as required, and thereafter adding the radical polymerization initiator (K) so as to cause polymerization, whereby a base polymer polyol (BA1) is obtained. Here, "(BA1)" means that the base polymer polyol is at a stage such that "i" of "(BAi-1)" mentioned later is 2;

(II) adding (b), as well as (A), (d), and (D) as required, to the obtained (BAi-1), and thereafter adding (K) so as to cause polymerization, whereby a base polymer polyol (BAi) is obtained [i is an integer of 2 to (n−1)]. It should be noted that this step (II) is not carried out when n is 2, but is carried out (n−2) times when n is not less than 3, whereby at the end of the step (II), a base polymer polyol (BAn−1) is obtained; and (III) adding (b), as well as (A), (d), and (D) as required, to the obtained (BAn−1), and thereafter adding (K) so as to cause polymerization, whereby the polymer polyol (I) is obtained.

The number n (the number of the polymerization stages) is the number of steps in which polymerization is performed, and is the total number of polymerization stages of the foregoing (I), (II), and (III).

The number n preferably is 2 to 7, more preferably 2 to 5, and particularly preferably 3 to 4, from the viewpoint of the content of coarse particles.

The radical polymerization initiator (K) may be used as it is, or alternatively, the radical polymerization initiator (K) dissolved (or dispersed) in the active-hydrogen containing compound (d), the diluent (C), the dispersant (D), and/or the polyol (A) may be used.

As the production method according to the present invention, the production method including the following steps (1) and (2) is preferred further, from the viewpoint of the production stability:

Step (1): polymerizing (b) in (A), in the presence of (d) and (D), so as to obtain a polymer polyol intermediate (B1); and Step (2): polymerizing (b) in the polymer polyol intermediate (B1), so as to obtain a polymer polyol intermediate (B2) or the polymer polyol (I').

Examples of the production method including Steps (1) and (2) include the multi-stage polymerization method, examples of which particularly include the above-described multi-stage one-step polymerization method.

In the present invention, the polymerization temperature (° C.) preferably is 100 to 200° C., more preferably 110 to 180° C., and particularly preferably 120 to 160° C., from the viewpoint of productivity, and with a view toward preventing the decomposition of the polyol.

The aforementioned production method (2) is a method in which the polymer particles (B) are produced and thereafter are dispersed in the polyol (A), in the presence of the active-hydrogen-containing compound (d), and in the presence of the dispersant (D) as required, whereby a polymer polyol is obtained. Examples of the production method (2) include the following methods.

First, the polymer particles (B) are produced by emulsion polymerization or suspension polymerization of the ethylenically unsaturated compound by any of various methods (e.g., the methods described in JP 5(1993)-148328 A, JP 8(1996)-100006 A, etc.). The (B) thus obtained are classified as required with a wet classifier (of a settling tank type, a mechanical classifier type, a centrifugal classifier type, etc.). The polymer particles (B) obtained herein are dispersed in (A), in the active-hydrogen-containing compound (d), and in the presence of the dispersant (D) as required, whereby the polymer polyol (I) can be obtained. For dispersion, a dispersion liquid in which (B) obtained by polymerization or wet classification is dispersed (hereinafter this dispersion liquid is referred to as "(B) dispersion liquid") may be used as it is, or the (B) dispersion liquid from which the solvent already has been removed by distillation may be used. In the case where the (B) dispersion liquid is used as it is, the polymer polyol of the present invention can be obtained by adding the polyol (A) and the active-hydrogen-containing compound (d), as well as the dispersant (D) as required to the (B) dispersion liquid and thereafter removing the solvent by distillation. In the case where the (B) dispersion liquid from which the diluent has been removed already by distillation is used, when (B) is dispersed in the (A), a high shearing power should be applied; this makes it possible to prevent the (B) from aggregating, thereby facilitating obtaining the polymer polyol of the present invention. A preferable device used for dispersion is a device performing dispersion by applying a high shearing power, such as a homomixer.

As the method for producing the polymer polyol of the present invention, it is particularly preferable to use, as the dispersant, the above-described active-hydrogen-containing compound (d) having a number-average molecular weight of 150 to 2,000 and having an aromatic ring, in the step of producing the polymer particles (B) and/or the step of dispersing (B) in (A).

The used amount (wt %) of (d) preferably 2 to 30 wt %, more preferably 3 to 25 wt %, and particularly preferably 5 to 20 wt % on the basis of the weight of the polymer particles (B), form the viewpoint of the particle diameter of the polymer particles in the polymer polyol.

Further, (C) may be added to the polymer polyol (I) or (I') as required, so as to make the polyol (I) or (I') have a further lower viscosity. Examples of (C) to be contained in (I) or (I') include the above-described saturated aliphatic hydrocarbons; aromatic hydrocarbons; and flame retardants having a low viscosity (not more than 100 mPa·s/25° C.), for instance, tris(chloroethyl)phosphate, tris(chloropropyl)phosphate, etc. However, it is preferable that (C) is not added to the polymer polyol (I) or (I'), from the viewpoint of decreasing volatile components in the polymer polyol.

The content of (C) in the obtained polymer polyol (I) or (I') preferably is not more than 2 wt %, and more preferably not more than 1 wt %, from the viewpoint of the physical properties of the polyurethane resin.

The polymer polyol (I) may be subjected to a monomer-removing and solvent-removing treatment as required. From the viewpoint of odors of the polyurethane resin, it is preferable to carry out the monomer-removing and solvent-removing treatment.

As the monomer-removing and solvent-removing treatment, any of known methods (the method disclosed in JP 2004-002800 A (corresponding to US 2005/245724 A1), etc.) can be used, among which preferred, from the viewpoint of the whiteness of the polyurethane resin, is a method of stripping monomers and/or a diluent under a reduced pressure.

An anti-aging agent and an antioxidant may be added as required to the obtained polymer polyol, whereby the discoloration of the polymer polyol and the discoloration of the polyurethane resin obtained using the same can be prevented. As the anti-aging agent and the antioxidant, those that are known can be used (those disclosed in JP 2006-188685 A, etc.), which include lactone, hindered phenol, phosphor-containing compounds, hindered amine, hydroxylamine, and sulfur-containing compounds. With a view to preventing the discoloration of the polyurethane resin, lactone and hindered phenol preferably are used in combination.

In a volume-based particle size distribution of the polymer particles (B) in the polymer polyol (I) or (I') obtained by polymerization of the ethylenically unsaturated compound (b), the distribution being derived from values in 85 divisions of the range of 0.020 μm to 2000 μm determined by the laser diffraction/scattering particle size distribution analyzer (LA-750, manufactured by HORIBA Ltd.; this applies hereinafter), the content of particles having diameters of not less than 10 μm in the polymer particles preferably is not more than 1 percent by volume (vol %), more preferably not more than 0.8 vol %, and particularly preferably 0 vol %, from the viewpoint of the physical properties (tear strength, etc.) of the polyurethane resin obtained using the same.

It should be noted that the polymer particles preferably have particle diameters substantially in a range of 0.020 to 2000 μm, from the viewpoint of the physical properties of the polyurethane resin. Herein "substantially" implies that not less than 99 vol %, preferably 100 vol %, of the particles have particle diameters in this range.

Further, the polymer particles in the polymer polyol (I) or (I') preferably have a volume-average particle diameter in a range of 0.2 to 1.5 μm, more preferably in a range of 0.25 to 1.2 μm, and particularly preferably in a range of 0.3 to 1.1 μm, the volume-average particle diameters being determined by the laser diffraction/scattering particle size distribution analyzer. When the volume-average particle diameter is in the foregoing range, the polyurethane resin obtained using the same has excellent physical properties.

The polymer polyol (I) and/or (I') is used as, at least a part of, the polyol component used when a polyurethane resin is produced. More specifically, the polyol (I) and/or (I') is used as, at least a part of, the polyol component, and is caused to react with a polyisocyanate component by a usual method in the presence of one or more types of usually used additives such as a catalyst, a blowing agent, and a foam stabilizer as required, so that a polyurethane resin is obtained. The polyol component may contain the aforementioned polyol (A) as required, in addition to (I) and (I').

The used amount (wt %) of (I) and (I') in the polyol component used for the production of the polyurethane resin preferably is 10 to 100 wt %, more preferably 15 to 90 wt %, particularly preferably 20 to 80 wt %, and most preferably 25 to 70 wt %, from the viewpoint of the mechanical properties of the polyurethane resin obtained and the viscosity of the polyol component.

As the polyisocyanate component, known organic polyisocyanate conventionally used in the production of polyurethane resins can be used. Examples of such polyisocyanate include those mentioned above as the polyisocyanate (h).

Among these, preferred are 2,4-TDI, 2,6-TDI, mixtures of these isomers, and crude TDI; 4,4'-MDI, 2,4'-MDI, mixtures of these isomers, and crude MDI; and modified polyisocyanates having a urethane group, a carbodiimido group, an allophanate group, a urea group, a biuret group, or an isocyanurate group derived from these polyisocyanates.

An isocyanate index [(equivalent ratio of NCO groups/active hydrogen atom-containing groups)×100] upon the production of the polyurethane resin usually is 80 to 140, preferably 85 to 120, and particularly preferably 95 to 115. Furthermore, the isocyanate index may be considerably higher than the above range (e.g., 300 to 1000) so that a polyisocyanurate group is introduced into the polyurethane resin.

In the production of the polyurethane resin, a catalyst normally used in a polyurethane-forming reaction [e.g., amine-based catalysts (tertiary amines such as triethylenediamine and N-ethylmorpholine); tin-based catalysts (stannous octoate, dibutyl tin dilaurate, etc.); and other metal catalysts (lead octoate, etc.)] may be used to accelerate the reaction.

The amount of the catalyst usually is 0.001 to 5% on the basis of the weight of the reaction mixture.

In the present invention, a blowing agent (water, HFC (hydrofluorocarbon), HCFC (hydrochlorofluorocarbon), methylene chloride, etc.) may be used in the production of the polyurethane resin, so that a polyurethane foam is obtained. The used amount of the blowing agent may be varied with a desired density of the polyurethane foam.

In the production of the polyurethane resin of the present invention, a foam stabilizer may be used as required. Examples of the foam stabilizer include silicone surfactants (e.g., polysiloxane-polyoxyalkylene copolymer).

In the present invention, an anti-aging agent and an antioxidant may be used as required. As the anti-aging agent and the antioxidant, those that are known can be used (those disclosed by JP 2006-188685 A, etc.), which include lactone, hindered phenol, phosphor-containing compounds, hindered amine, hydroxylamine, and sulfur-containing compounds. With a view to preventing the discoloration of the polyurethane resin, lactone and hindered phenol preferably are used in combination.

Examples of other additives that can be used in the production method of the present invention include known additives (those disclosed by JP 2005-162791 A, etc.) such as a flame retarder, a reaction retarder, a coloring agent, an internal mold release agent, an anti-aging agent, an antioxidant, a plasticizer, an antibacterial agent, carbon black, and other fillers.

Production of a polyurethane resin can be carried out by an ordinary method, for example, a one shot method, a semiprepolymer method, a prepolymer method, or another known method.

In the production of polyurethane, a usually used production device can be employed. When no solvent is used, for example, a device such as a kneader or an extruder can be employed. Various types of non-foamed or foamed polyurethane resins can be produced within a closed or open mold. In the production of polyurethane, usually the materials are mixed and caused to react with use of a mechanical device at a low pressure or a high pressure. Furthermore, in the production of a polyurethane resin, gas such as the air dissolved in the materials before or after the raw materials are mixed (particularly before the raw materials are mixed) or the air intermixed at the time of mixing can be removed by a vacuum method.

The polymer polyol (I) and/or (I') is particularly useful for the production of a polyurethane foam such as a flexible molded foam or a slabstock foam. Furthermore, the polyol also can be used suitably for the molding by the RIM (reaction injection molding) method.

EXAMPLES

The present invention is described in more detail with reference to the following examples. However, the present invention is not limited to these examples in any way. In the following, the values of parts, percentages, and ratios indicate those of parts by weight, percentages by weight, and ratios by weight, respectively, unless otherwise provided.

The compositions, symbols, etc. of the materials used in the examples and comparative examples are as follows:
(1) Polyol (A1):
  polyol (A1-1): polyol obtained by adding PO-EO-PO in this order to glycerol, having a hydroxyl value of 56, an internal EO unit content of 5%, and an terminal PO unit content of 5%;
  polyol (A1-2): polyol obtained by adding PO-EO in this order to pentaerythritol, having a hydroxyl value of 32, and a terminal EO unit content of 14%; and
  polyol (A1-3): polyol obtained by adding PO-EO in this order to glycerol, having a hydroxyl value of 33.7, and a terminal EO unit content of 14%.
(2) Radical Polymerization Initiator (k):
  k-1: 2,2'-azobis(2-methylbutyronitrile) [trade name: "V-59" produced Wako Pure Chemical Industries, Ltd.].
(3) Dispersant (D):
  D-1: reactive dispersant obtained by coupling 0.14 mole of the polyol (A1-2) and 0.07 mole of 2-hydroxyethyl methacrylate with use of 0.16 mole of TDI, the reactive dispersant having a hydroxyl value of 20, a ratio of the number of unsaturated groups/the number of nitrogen-containing groups of 0.22 [see JP 2002-308920 A (corresponding to U.S. Pat. No. 6,756,414)];
  D-2: oligomer-type non-reactive dispersant of acrylonitrile (ACN)-styrene (St) copolymer in which a ratio by weight of ACN:St is 70:30. {This oligomer-type dispersant was used in a state of being mixed in the polyol (A1-3) so that a content of this dispersant was 10 wt %. This copolymer-type oligomer had a Mn of 247,710 in terms of polystyrene determined by GPC. This mixture had a hydroxyl value of 29.0}; and
  D-3: oligomer-type non-reactive dispersant of ACN—St copolymer in which a ratio by weight of ACN:St is 30:70. {This oligomer-type dispersant was used in a state of being mixed in the polyol (A1-3) so that a content of this dispersant was 10 wt %. This copolymer-type oligomer had a Mn of 101,763 in terms of polystyrene determined by GPC. This mixture had a hydroxyl value of 29.0.}
(4) Active-Hydrogen-Containing Compound (d)
  d-1: active-hydrogen-containing compound obtained by adding PO to bisphenol A (hydroxyl equivalent: 114, SP value: 13.6), the compound having a number-average molecular weight of 518;
  d-2: active-hydrogen-containing compound obtained by adding PO to monostyrenated phenol (hydroxyl equivalent: 198, SP value: 12.1), the compound having a number-average molecular weight of 778;
  d-3: active-hydrogen-containing compound obtained by adding PO and EO by random addition to distyrenated phenol (hydroxyl equivalent: 302, SP value: 11.6), the compound having a number-average molecular weight of 1554; and
  d-4: active-hydrogen-containing compound obtained by adding PO to butanol (hydroxyl equivalent: 74, SP value: 11.3), the compound having a number-average molecular weight of 654.
(5) Polyisocyanate
  Polyisocyanate: "CORONATE T-80" (TDI) [produced by Nippon Polyurethane Industry Co., Ltd.]
(6) Catalyst
  Catalyst A: "Neostann U-28" (stannous octoate) [produced by Nitto Kasei Co., Ltd.]; and
  Catalyst B: "DABCO" (triethylenediamine) [produced by Nippon Nyukazai Co., Ltd.]
(7) Foam Stabilizer
  "SRX-280A" (polyether siloxane polymer) [produced by Dow Corning Toray Silicone Co., Ltd.]

Methods of measurement and evaluation for Examples are as follows.
<Content of Particles in Sizes of 10 μm or More, and Volume-Average Particle Diameter of the Particles>

An obtained polymer polyol was diluted with a polyol used in the production of the polymer polyol so that a transmittance of laser light was 70 to 90%, and the content (vol %) of particles having a diameter of 10 μm or more and the volume-average particle diameter (μm) of the foregoing particles were determined by the particle size distribution analyzer shown below.

It should be noted that the "particles" herein refer to polymer particles in a polymer polyol, and the "volume-average particle diameter" refers to a volume-average particle diameter of the polymer particles.

Device: LA-750, manufactured by HORIBA Ltd.
Measurement theory: Mie diffusion theory
Measurement range: 0.04 μm to 262 μm
Amount of injected solution: He—Ne laser
Measurement time: 20 seconds <Volume-Average Particle Diameter>

The volume-average particle diameter was calculated using the following equation.

$$\text{Volume-average particle diameter (μm)} = \Sigma[q(J) \times X(J)] / \Sigma[q(J)]$$

J: particle diameter range division number (1 to 85)
q(J): mode distribution value (%)
X(J): particle diameter (μm) of particles in a particle diameter range division No. J <Content of Polymer Particles>

About 5 g of a polymer polyol was weighed precisely in a 50-ml centrifuge tube, and this weight was assumed to be a polymer polyol weight (W1). This was diluted with 50 g of methanol added thereto. Using a refrigerated centrifuge [model: H-9R, manufactured by Kokusan Co., Ltd.], centrifugation was performed at 20° C., 18,000 rpm for 60 minutes. Supernatant fluid was removed with a glass pipette. Operations of diluting residual sediment with 50 g of methanol added thereto, subjecting the solution to the same centrifugation, and removing supernatant fluid in the same manners as those described above are repeated three more times. The residual sediment in the centrifuge tube was dried under a reduced pressure of 2,666 to 3,999 Pa (20 to 30 torr), at 60° C., for 60 minutes, the weight of the sediment thus dried was measured, and this weight was assumed to be (W2). The value determined by calculation of the following expression is assumed to be the content (wt %) of polymer particles:

$$\text{Content of polymer particles (wt \%)} = (W2) \times 100 / (W1)$$

<Viscosity>

The viscosity was measured using a BL-type viscometer (Tokyo Keiki Kogyo Co., Ltd.) under conditions of No. 3 rotor, 12 rpm, and 25° C.

<Coefficient of Viscosity>

Coefficients of viscosity of a polymer polyol were measured under conditions of 25° C. with a rheometer [manufactured by TA Instruments Japan Co.] at shearing speeds of 0.1 (1/s), 1.0 (1/s), and 10.0 (1/s), respectively.

<Conversion Ratio>

A residual monomer content of each type of monomers with respect to a used amount of monomers was determined, and a conversion ratio was calculated from a weight average of these residual monomer contents. The residual monomer content was calculated from an area ratio with respect to an internal standard substance determined by gas chromatography. A specific analysis method is shown below, in which styrene is used as an example.

$$\text{Conversion ratio [wt \%]} = 100 - 100 \times \frac{(\text{residual styrene content [\%]})}{(\text{amount of stryrene used in row materials[\%]})}$$

Residual styrene content [%] =

$L/M \times$ (factor with respect to internal standard substance)

$L$ = (peak area of residual styrene)/(weight [g] of polymer polyol)

$M$ = (peak area of internal standard substance)/(weight [g] of internal standard substance)

The factor with respect to internal standard substance is a value obtained by dividing a peak area of each monomer per a certain mass by a peak area of the internal standard substance per the same mass.

Gas chromatograph: GC-14B (manufactured by Shimadzu Corporation)
Column: inner diameter: 4 mmφ, length: 1.6 mm, made of glass
Column filler: polyethylene glycol 20 M (manufactured by Shinwa Chemical Industries, Ltd.)
Internal standard substance: bromobenzene (manufactured by Nacalai Tesque, Inc.)
Diluting solvent: dipropylene glycol monomethyl ether, extra pure reagent [manufactured by Wako Pure Chemical Industries, Ltd.] (used in a state of 50% solution)

| | |
|---|---|
| Injection temperature: | 200° C. |
| Column initial temperature: | 110° C. |
| Temperature rising rate: | 5° C./min |
| Column final temperature: | 200° C. |
| Sample injection amount: | 1 μl |

Example 1

Production of Polymer Polyol Intermediate (I-1)

Into a four-neck flask provided with a thermoregulator, a vacuum rotor, a dropping pump, a decompression device, a Dimroth condenser, and nitrogen inlet and outlet, the following were charged as initial-charge materials: 193.6 parts of the polyol (A1-1); 61.6 parts of xylene; 14.0 parts of the dispersant (D-1); and 28.0 parts of the active-hydrogen-containing compound (d-1). After the atmosphere was replaced with nitrogen, the temperature of the mixture was increased to 130° C. under agitation in the nitrogen atmosphere (until the polymerization ended). Subsequently, a monomer-containing mixture solution (M-1) obtained by preliminarily mixing 97.3 parts of the polyol (A1-1), 84.0 part of acrylonitrile, 196.0 parts of styrene, 0.3 part of divinylbenzene, 14.0 parts of the dispersant (D-1), 8.4 parts of xylene, and 2.8 parts of the radical polymerization initiator (k-1), was dropped continuously at a rate of 2 parts per minute by using the dropping pump, so that the polymerization occurred at 130° C. for 240 minutes, whereby a polymer polyol intermediate (Z-1) was obtained. Non-reacted monomers and xylene were removed from (Z-1) by vacuum stripping at 2,666 to 3,999 Pa (20 to 30 torr) for two hours. As a result, a polymer polyol (I-1) was obtained. The polymer polyol (I-1) was evaluated by the aforementioned measurement and evaluation methods. The results are shown in Table 2.

Examples 2 to 6 and Comparative Examples 1 to 4

Production of Polymer Polyols (I-2) to (R-4)

Polymer polyols (I-2) to (I-6) and comparative polymer polyols (R-1) to (R-4) were obtained in the same manner as that of Example 1 except that the initial-charge materials and the monomer-containing mixture solutions used therein had compositions shown in Table 1. These were subjected to the same measurements and evaluations as those of Example 1. The results are shown in Table 2.

Examples 1 to 4, as well as other materials at formulation ratios shown in Table 3, under foaming conditions shown below. The results of measurement of foam properties of these polyurethane foams are shown in Table 3. The foaming process is as follows:

TABLE 1

|  |  | Example |  |  |  |  |  | Comp. Ex. |  |  |  |
|---|---|---|---|---|---|---|---|---|---|---|---|
|  |  | 1 | 2 | 3 | 4 | 5 | 6 | 1 | 2 | 3 | 4 |
| Initial-charge material (part) | A1-1 | 193.6 | 218.8 | 202 | 207.6 | 193.6 | 193.6 | 221.6 | 235.4 | 234.5 | 171.2 |
|  | Xylene | 61.6 | 61.6 | 61.6 | 61.6 | 61.6 | 61.6 | 61.6 | 61.8 | 62.7 | 61.6 |
|  | D-1 | 14 | 14 | 5.6 | 0 | 14 | 14 | 14 | 0 | 0 | 36.4 |
|  | d-1 | 28 | 2.8 | 28 | 28 | — | — | — | — | — | — |
|  | d-2 | — | — | — | — | 28 | — | — | — | — | — |
|  | d-3 | — | — | — | — | — | 28 | — | — | — | — |
|  | d-4 | — | — | — | — | — | — | — | — | — | 28 |
| Monomer-containing mixture solution (part) | A1-1 | 97.3 | 97.3 | 102.9 | 111.3 | 97.3 | 97.3 | 97.3 | 105 | 147.8 | 97.3 |
|  | Acrylonitrile | 84 | 84 | 84 | 84 | 84 | 84 | 84 | 81.9 | 73.5 | 84 |
|  | Styrene | 196 | 196 | 196 | 196 | 196 | 196 | 196 | 191.1 | 171.5 | 196 |
|  | Divinylbenzene | 0.3 | 0.3 | 0.3 | 0.3 | 0.3 | 0.3 | 0.3 | 0.3 | 0.2 | 0.3 |
|  | D-1 | 14 | 14 | 8.4 | 0 | 14 | 14 | 14 | 13.7 | 0 | 14 |
|  | Xylene | 8.4 | 8.4 | 8.4 | 8.4 | 8.4 | 8.4 | 8.4 | 8.2 | 7.4 | 8.4 |
|  | k-1 | 2.8 | 2.8 | 2.8 | 2.8 | 2.8 | 2.8 | 2.8 | 2.7 | 2.5 | 2.8 |

TABLE 2

|  |  | Example |  |  |  |  |  | Comparative Example |  |  |  |
|---|---|---|---|---|---|---|---|---|---|---|---|
|  |  | 1 (I-1) | 2 (I-2) | 3 (I-3) | 4 (I-4) | 5 (I-5) | 6 (I-6) | 1 (R-1) | 2 (R-2) | 3 (R-3) | 4 (R-4) |
| Volume-average particle diameter (μm) |  | 0.35 | 0.34 | 0.39 | 0.42 | 0.36 | 0.37 | 0.52 | 0.72 | 1.62 | 0.58 |
| Content of particles having diameter of 10 μm or more (wt %) |  | 0 | 0 | 0 | 0 | 0 | 0 | 0 | 0 | 5 | 0 |
| Content of polymer particles (wt %) |  | 43.7 | 43.6 | 43.7 | 43.7 | 43.8 | 43.7 | 43.7 | 42.7 | 38.1 | 43.7 |
| Viscosity (mPa·s 25° C.) |  | 4200 | 3900 | 3500 | 2800 | 3800 | 3900 | 4500 | 4500 | 3400 | 6200 |
| Conversion ratio (%) |  | 96.2 | 95.8 | 95.9 | 96.2 | 96.3 | 96.1 | 96.2 | 96.4 | 95.8 | 95.9 |
| Coefficient of viscosity (Pa·s) | N1 | 4.2 | 3.9 | 3.5 | 2.8 | 3.8 | 3.9 | 4.5 | 4.5 | 3.4 | 6.2 |
|  | N2 | 5.1 | 5 | 4.9 | 5.5 | 5.3 | 4.8 | 5.6 | 5.6 | 4.2 | 7.7 |
|  | N3 | 4.8 | 4.2 | 4 | 3.3 | 4.2 | 4.4 | 4.8 | 5.3 | 4 | 7.3 |
| Formula | Formula (3) | Satisfied | Satisfied | Satisfied | Satisfied | Satisfied | Satisfied | Not satisfied | Not satisfied | Not satisfied | Not satisfied |
|  | Formula (4) | Satisfied | Satisfied | Satisfied | Not satisfied | Not satisfied | Satisfied | Not satisfied | Not satisfied | Not satisfied | Not satisfied |
|  | Formula (5) | Satisfied | Satisfied | Satisfied | Satisfied | Satisfied | Satisfied | Satisfied | Not satisfied | Not satisfied | Not satisfied |

The results indicated in Table 2 show that the polymer polyols of Examples 1 to 6 had smaller volume-average particle diameters, as compared with those of Comparative Examples 1 to 4. Further, the results also show that the polymer polyols of Examples 1 to 6 had smaller viscosities, as compared with those of Comparative Examples 1, 2, and 4, even though the polymer contents in Examples were substantially identical to those in Comparative Examples.

Examples 7 to 12 and Comparative Examples 5 to 8

Production of Polyurethane Foams

Polyurethane foams were produced using the polymer polyols (I-1) to (I-6) and comparative polymer polyols (R-1) to (R-4) obtained in Examples 1 to 6 and Comparative

[1] Respective temperatures of the polymer polyol, the polyol (A1-1), and polyisocyanate were adjusted to 25±2° C.;

[2] The polymer polyol, the polyol (A1-1), a foam stabilizer, water, and a catalyst were charged in this order into a paper cup having a capacity of 1 liter, and mixed at room temperature (25° C.±2° C.) under agitation. Polyisocyanate was added immediately to the mixture, and the mixture was agitated with an agitator [Homodisper; manufactured by TOKUSHU KIKAINDUSTRIES, Ltd., agitation condition: 2000 rpm×8 seconds], so as to be foamed.

[3] After the agitation was stopped, the mixed contents in the paper cup were charged into a 25 cm×25 cm×10 cm wooden box (at 25±2° C.), whereby a polyurethane foam was obtained.

TABLE 3

|  |  | Example | | | | | | Comparative Example | | | |
| --- | --- | --- | --- | --- | --- | --- | --- | --- | --- | --- | --- |
|  |  | 7 | 8 | 9 | 10 | 11 | 12 | 5 | 6 | 7 | 8 |
| Formulation ratio (Part) | Polymer polyol | (I-1) | (I-2) | (I-3) | (I-4) | (I-5) | (I-6) | (R-1) | (R-2) | (R-3) | (R-4) |
|  |  | 75 | 75 | 75 | 75 | 75 | 75 | 75 | 75 | 75 | 75 |
|  | Polyol (A1-1) | 25 | 25 | 25 | 25 | 25 | 25 | 25 | 25 | 25 | 25 |
|  | Water | 2.8 | 2.8 | 2.8 | 2.8 | 2.8 | 2.8 | 2.8 | 2.8 | 2.8 | 2.8 |
|  | Catalyst A | 0.06 | 0.06 | 0.06 | 0.06 | 0.06 | 0.06 | 0.06 | 0.06 | 0.06 | 0.06 |
|  | Catalyst B | 0.18 | 0.18 | 0.18 | 0.18 | 0.18 | 0.18 | 0.18 | 0.18 | 0.18 | 0.18 |
|  | SRX-280A | 0.5 | 0.5 | 0.5 | 0.5 | 0.5 | 0.5 | 0.5 | 0.5 | 0.5 | 0.5 |
|  | Polyisocyanate | 35.8 | 35.3 | 35.9 | 36 | 35.2 | 35.1 | 35.2 | 35.3 | 35.6 | 35.2 |
| <Foam properties> | | | | | | | | | | | |
| Density [kg/m$^3$] | | 34.9 | 34.8 | 34.7 | 34.8 | 35.2 | 35 | 34.1 | 34.2 | 33.2 | 35.2 |
| 25% ILD [kgf/314 cm$^2$] | | 35.1 | 35.2 | 34.4 | 34.2 | 34.5 | 34.6 | 33.8 | 33.2 | 30.3 | 34 |
| Tensile strength [kgf/cm$^2$] | | 1.65 | 1.64 | 1.59 | 1.61 | 1.58 | 1.63 | 1.57 | 1.42 | 0.92 | 1.28 |
| Tear strength [kgf/cm] | | 0.96 | 0.94 | 0.9 | 0.89 | 0.92 | 0.88 | 0.87 | 0.72 | 0.62 | 0.78 |
| Elongation at break [%] | | 101 | 102 | 100 | 99 | 105 | 104 | 98 | 90 | 95 | 92 |
| Compression set [%] | | 2.7 | 2.4 | 2.2 | 2.7 | 2.6 | 2.4 | 2.7 | 2.5 | 2.8 | 2.6 |
| Whiteness | | 2.5 | 2.8 | 2.9 | 3.1 | 2.7 | 2.6 | 2.5 | 2.4 | 2.4 | 2.6 |

Foam property evaluating methods adopted for Table 3 are as follows:

Density (kg/m$^3$): according to JIS K6400-1997 [item 5]

25% ILD (hardness) (kgf/314 cm$^2$): according to JIS K6382-1995 [item 5.3]

Tensile strength (kgf/cm$^2$): according to JIS K6301-1995 [item 3]

Tear strength (kgf/cm): according to JIS K6301-1995 [item 9]

Elongation at break (%): according to JIS K6301-1995 [item 3]

Compression set (%): according to JIS K6382-1995 [item 5.5]

Whiteness: according to JIS 8715-1995

It should be noted that usually, for the properties of polyurethane foams, a density in the range of 15 to 50 kg/m$^3$ is preferable, and larger values of 25% ILD, tensile strength, tear strength, and elongation at break are preferable. Furthermore, a smaller value of compression set is preferable.

From the results shown in Table 3, the following is clarified. The polyurethane foams of Examples 7 to 12, which were formed of substantially the same raw material compositions as those of Comparative Examples 5 to 8 except for the polymer polyols, exhibited excellent 25% ILD (hardness), excellent tensile strengths, and excellent tear strengths.

Example 13

Production of Polymer Polyol (I-13)

Into a four-neck flask provided with a thermoregulator, a vacuum rotor, a dropping pump, a decompression device, a Dimroth condenser, and nitrogen inlet and outlet, the following were charged as initial-charge materials: 214.6 parts of the polyol (A1-1); 61.6 parts of xylene; 12.6 parts of the dispersant (D-1); and 8.4 parts of the active-hydrogen-containing compound (d-1). After the atmosphere was replaced with nitrogen, the temperature of the mixture was increased to 130° C. under agitation in the nitrogen atmosphere (until the polymerization ended). Subsequently, a monomer-containing mixture solution (M-13) obtained by preliminarily mixing 98.7 parts of the polyol (A1-1), 84.0 part of acrylonitrile, 196.0 parts of styrene, 0.3 part of divinylbenzene, 12.6 parts of the dispersant (D-1), 8.4 parts of xylene, and 2.8 parts of the radical polymerization initiator (k-1), was dropped continuously at a rate of 2 parts per minute by using the dropping pump, so that the polymerization occurred at 130° C. for 240 minutes, whereby a polymer polyol intermediate (Z-13) was obtained. Non-reacted monomers and xylene were removed from (Z-13) by vacuum stripping at 2,666 to 3,999 Pa (20 to 30 torr) for two hours. As a result, a polymer polyol (I-13) was obtained. The polymer polyol (I-13) was evaluated by the aforementioned measurement and evaluation methods. The results are shown in Table 5.

Examples 14 to 25 and Comparative Examples 9 to 11

Production of Polymer Polyols (I-14) to (I-25) and (R-9) to (R-11)

Polymer polyols (I-14) to (I-25) and comparative polymer polyols (R-9) to (R-11) were obtained in the same manner as that of Example 13 except that the initial-charge materials and the monomer-containing mixture solutions used therein had compositions shown in Table 4. These were subjected to the same measurements and evaluations as those for Example 1. The results are shown in Table 5.

TABLE 4

|  |  | Example | | | | | | | | | | | | | Comp. Ex. | | |
| --- | --- | --- | --- | --- | --- | --- | --- | --- | --- | --- | --- | --- | --- | --- | --- | --- | --- |
|  |  | 13 | 14 | 15 | 16 | 17 | 18 | 19 | 20 | 21 | 22 | 23 | 24 | 25 | 9 | 10 | 11 |
| Initial-charge material (part) | A1-1 | 214.6 | 178.2 | 190.8 | 214.6 | 214.6 | 214.6 | 214.6 | 178.2 | 190.8 | 214.6 | 214.6 | 199.2 | 199.2 | 227.2 | 223.0 | 171.2 |
|  | Xylene | 61.6 | 61.6 | 61.6 | 61.6 | 61.6 | 61.6 | 61.6 | 61.6 | 61.6 | 61.6 | 61.6 | 61.6 | 61.6 | 61.6 | 61.6 | 61.6 |
|  | d-1 | 8.4 | 56.0 | 2.8 | — | — | 8.4 | 8.4 | 56.0 | 2.8 | — | — | 28.0 | 28.0 | 8.4 | — | — |
|  | d-2 | — | — | — | 8.4 | — | — | — | — | — | 8.4 | — | — | — | — | — | — |
|  | d-3 | — | — | — | — | 8.4 | — | — | — | — | — | 8.4 | — | — | — | — | — |

TABLE 4-continued

| | | Example | | | | | | | | | | | | | Comp. Ex. | | |
|---|---|---|---|---|---|---|---|---|---|---|---|---|---|---|---|---|---|
| | | 13 | 14 | 15 | 16 | 17 | 18 | 19 | 20 | 21 | 22 | 23 | 24 | 25 | 9 | 10 | 11 |
| | d-4 | — | — | — | — | — | — | — | — | — | — | — | — | — | — | — | 28.0 |
| | D-1 | 12.6 | 1.4 | 42.0 | 12.6 | 12.6 | — | — | — | — | — | — | 8.4 | — | — | — | 36.4 |
| | D-2 | — | — | — | — | — | 12.6 | — | 1.4 | 42.0 | 12.6 | 12.6 | — | 8.4 | — | 12.6 | — |
| | D-3 | — | — | — | — | — | — | 12.6 | — | — | — | — | — | — | — | — | — |
| Monomer- | A1-1 | 98.7 | 109.9 | 69.3 | 98.7 | 98.7 | 98.7 | 98.7 | 109.9 | 69.3 | 98.7 | 98.7 | 102.9 | 102.9 | 111.3 | 98.7 | 97.3 |
| containing | Acrylonitrile | 84.0 | 84.0 | 84.0 | 84.0 | 84.0 | 84.0 | 84.0 | 84.0 | 84.0 | 84.0 | 84.0 | 84.0 | 84.0 | 84.0 | 84.0 | 84.0 |
| mixture | Styrene | 196.0 | 196.0 | 196.0 | 196.0 | 196.0 | 196.0 | 196.0 | 196.0 | 196.0 | 196.0 | 196.0 | 196.0 | 196.0 | 196.0 | 196.0 | 196.0 |
| solution | Divinylbenzene | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| (part) | D-1 | 12.6 | 1.4 | 42.0 | 12.6 | 12.6 | — | — | — | — | — | — | 8.4 | — | — | — | 14.0 |
| | D-2 | — | — | — | — | — | 12.6 | — | 1.4 | 42.0 | 12.6 | 12.6 | — | 8.4 | — | 12.6 | — |
| | D-3 | | | | | | | 12.6 | | | | | | | | | |
| | Xylene | 8.4 | 8.4 | 8.4 | 8.4 | 8.4 | 8.4 | 8.4 | 8.4 | 8.4 | 8.4 | 8.4 | 8.4 | 8.4 | 8.4 | 8.4 | 8.4 |
| | k-1 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 |

TABLE 5

| | Example | | | | | | | |
|---|---|---|---|---|---|---|---|---|
| | 13 (I-13) | 14 (I-14) | 15 (I-15) | 16 (I-16) | 17 (I-17) | 18 (I-18) | 19 (I-19) | 20 (I-20) |
| Volume-average particle diameter (μm) | 0.35 | 0.40 | 0.36 | 0.37 | 0.38 | 0.34 | 0.36 | 0.39 |
| Content of particles having diameter of 10 μm or more (wt %) | 0 | 0 | 0 | 0 | 0 | 0 | 0 | 0 |
| Content of polymer particles (wt %) | 43.7 | 43.7 | 43.7 | 43.7 | 43.7 | 43.6 | 43.7 | 43.6 |
| Viscosity (mPa·s 25° C.) | 3600 | 4000 | 4300 | 3700 | 3800 | 2800 | 2800 | 4000 |
| Conversion ratio (%) | 96.1 | 96 | 96.2 | 96.1 | 96.0 | 95.9 | 96.0 | 95.9 |

| | Example | | | | | Comp. Ex. | | |
|---|---|---|---|---|---|---|---|---|
| | 21 (I-21) | 22 (I-22) | 23 (I-23) | 24 (I-24) | 25 (I-25) | 9 (R-9) | 10 (R-10) | 11 (R-11) |
| Volume-average particle diameter (μm) | 0.35 | 0.37 | 0.38 | 0.39 | 0.39 | 1.51 | 0.74 | 0.58 |
| Content of particles having diameter of 10 μm or more (wt %) | 0 | 0 | 0 | 0 | 0 | 5 | 0 | 0 |
| Content of polymer particles (wt %) | 43.7 | 43.7 | 43.7 | 43.7 | 43.7 | 43.6 | 43.6 | 43.7 |
| Viscosity (mPa·s 25° C.) | 3500 | 3500 | 3700 | 4000 | 3700 | 3300 | 3400 | 6200 |
| Conversion ratio (%) | 96.1 | 96.0 | 96.2 | 96.1 | 96.1 | 95.8 | 95.9 | 95.9 |

The results indicated in Table 5 show that the polymer polyols of Examples 13 to 25 had smaller volume-average particle diameters, as compared with those of Comparative Examples 9 to 11. Further, the results also show that the contents of particles having diameters of 10 μm or more in the polymer polyols of Examples 13 to 25 were equal to or less than those of Comparative Examples 9 to 11.

Examples 26 to 38 and Comparative Examples 12 to 14

Production of Polyurethane Foam

Polyurethane foams were produced using the polymer polyols (I-13) to (I-25) and comparative polymer polyols (R-9) to (R-11) obtained in Examples 13 to 25 and Comparative Examples 9 to 11, as well as other materials at formulation ratios shown in Table 6, under the same foaming conditions as those of Example 7. The results of measurement of foam properties of these polyurethane foams are shown in Table 6.

TABLE 6

| | | Example | | | | | | | |
|---|---|---|---|---|---|---|---|---|---|
| | | 26 | 27 | 28 | 29 | 30 | 31 | 32 | 33 |
| Formulation ratio (Part) | Polymer polyol | (I-13) 75 | (I-14) 75 | (I-15) 75 | (I-16) 75 | (I-17) 75 | (I-18) 75 | (I-19) 75 | (I-20) 75 |
| | Polyol (A1-1) | 25 | 25 | 25 | 25 | 25 | 25 | 25 | 25 |

TABLE 6-continued

|  |  |  |  |  |  |  |  |  |  |
|---|---|---|---|---|---|---|---|---|---|
|  | Water | 2.8 | 2.8 | 2.8 | 2.8 | 2.8 | 2.8 | 2.8 | 2.8 |
|  | Catalyst A | 0.06 | 0.06 | 0.06 | 0.06 | 0.06 | 0.06 | 0.06 | 0.06 |
|  | Catalyst B | 0.18 | 0.18 | 0.18 | 0.18 | 0.18 | 0.18 | 0.18 | 0.18 |
|  | SRX-280A | 0.5 | 0.5 | 0.5 | 0.5 | 0.5 | 0.5 | 0.5 | 0.5 |
|  | Polyisocyanate | 35.8 | 35.3 | 35.9 | 36 | 35.2 | 35.1 | 35.1 | 35.8 |
| <Foam properties> | | | | | | | | | |
| Density [kg/m$^3$] | | 34.9 | 34.8 | 34.7 | 34.8 | 35.2 | 35.0 | 34.8 | 35.0 |
| 25% ILD [kgf/314 cm$^2$] | | 35.0 | 34.4 | 35.0 | 34.9 | 34.6 | 35.2 | 34.9 | 34.4 |
| Tensile strength [kgf/cm$^2$] | | 1.63 | 1.57 | 1.61 | 1.59 | 1.58 | 1.62 | 1.57 | 1.56 |
| Tear strength [kgf/cm] | | 0.97 | 0.91 | 0.93 | 0.94 | 0.91 | 0.97 | 0.95 | 0.93 |
| Elongation at break [%] | | 101 | 103 | 99 | 101 | 103 | 99 | 100 | 105 |
| Compression set [%] | | 2.5 | 2.8 | 2.4 | 2.5 | 2.8 | 2.7 | 2.5 | 2.9 |

|  |  | Example | | | | | Comp. Ex. | | |
|---|---|---|---|---|---|---|---|---|---|
|  |  | 34 | 35 | 36 | 37 | 38 | 12 | 13 | 14 |
| Formulation ratio (Part) | Polymer polyol | (I-21) | (I-22) | (I-23) | (I-24) | (I-25) | (R-12) | (R-13) | (R-14) |
|  |  | 75 | 75 | 75 | 75 | 75 | 75 | 75 | 75 |
|  | Polyol (A1-1) | 25 | 25 | 25 | 25 | 25 | 25 | 25 | 25 |
|  | Water | 2.8 | 2.8 | 2.8 | 2.8 | 2.8 | 2.8 | 2.8 | 2.8 |
|  | Catalyst A | 0.06 | 0.06 | 0.06 | 0.06 | 0.06 | 0.06 | 0.06 | 0.06 |
|  | Catalyst B | 0.18 | 0.18 | 0.18 | 0.18 | 0.18 | 0.18 | 0.18 | 0.18 |
|  | SRX-280A | 0.5 | 0.5 | 0.5 | 0.5 | 0.5 | 0.5 | 0.5 | 0.5 |
|  | Polyisocyanate | 35.3 | 35.9 | 36 | 35.2 | 35.1 | 35.2 | 35.3 | 35.3 |
| <Foam properties> | | | | | | | | | |
| Density [kg/m$^3$] | | 34.9 | 34.7 | 34.8 | 34.7 | 35 | 34.4 | 34.6 | 35.2 |
| 25% ILD [kgf/314 cm$^2$] | | 34.9 | 34.7 | 34.7 | 34.6 | 34.6 | 30.1 | 33.1 | 34 |
| Tensile strength [kgf/cm$^2$] | | 1.61 | 1.58 | 1.61 | 1.60 | 1.60 | 0.92 | 1.43 | 1.28 |
| Tear strength [kgf/cm] | | 0.98 | 0.93 | 0.94 | 0.96 | 0.95 | 0.63 | 0.72 | 0.78 |
| Elongation at break [%] | | 100 | 101 | 101 | 99 | 100 | 75 | 85 | 92 |
| Compression set [%] | | 2.4 | 2.6 | 2.7 | 2.6 | 2.7 | 2.5 | 2.5 | 2.6 |

Foam property evaluating methods adopted for Table 6 are the same as described above.

From the results shown in Table 6, the following is clarified. The polyurethane foams of Examples 26 to 38, which were formed of substantially the same raw material compositions as those of Comparative Examples 12 to 14 except for the polymer polyols, exhibited excellent 25% ILD (hardness), excellent tensile strengths, and excellent tear strengths.

Example 39

Production of Polymer Polyol (I-39)

[First step] Two continuous polymerization devices (2-liter SUS-made pressure-resistant reaction containers, to each of which a solution sending line and an overflow line were connected) were prepared, and the foregoing two devices (hereinafter referred to as first and second devices) were arranged in series in a manner such that the overflow line of a polymerization vessel of the first device was connected with an inlet of a polymerization vessel of the second device. 2000 parts of an initial-charge solution (L-1) prepared by mixing the polyol (A1-1) and xylene was charged in each of the polymerization vessels of the first and second devices in advance, and was heated to 130° C. The numbers of mixed parts of the materials for the initial-charge solution (L-1) are shown in Table 7. A material mixture solution (G1-1) obtained by mixing (A1-1), (D-1), acrylonitrile, styrene, divinylbenzene, the radical polymerization initiator (k-1), and xylene was in-line-blended with a static mixer. The numbers of mixed parts of the materials for the material mixture solution (G1-1) are shown in Table 7. Thereafter, the mixture solution was sent continuously to the polymerization vessel of the first device at a solution sending rate for the first device shown in Table 7. Thus, a polymer polyol intermediate (IB1-1) that overflowed from the polymerization vessel was obtained. The polymer polyol intermediate (IB1-1) overflowed from the polymerization vessel of the first device was sent continuously to the polymerization vessel of the second device at the same solution sending rate as that for the first device shown in Table 7.

[Second step] A material mixture solution (G1-2) obtained by mixing (IB1-1) overflowed from the first device at the solution sending rate for the first device shown in Table 7, (A1-1), acrylonitrile, styrene, the radical polymerization initiator (k-1), and xylene were in-line-blended with a static mixer. The numbers of parts of these materials mixed are shown in Table 7. Thereafter, the mixture solution was sent continuously to the polymerization vessel of the second device at a solution sending rate for the second device shown in Table 7. A reaction solution overflowed from the polymerization vessel was stocked in a SUS-made receiver, whereby a polymer polyol intermediate (IB1-2) was obtained. Non-reacted monomers and xylene were removed from (IB1-2) by vacuum stripping at 2,666 to 3,999 Pa (20 to 30 torr) at 130 to 140° C. for two hours, with heated steam being added through another inlet (steam in an amount, as a water contained therein, equivalent to 4 wt % with respect to the polymer polyol was charged over 2 hours). As a result, a polymer polyol (I-39) was obtained. The polymer polyol (I-39) was measured and evaluated by the above-described measurement and evaluation methods. The results are shown in Table 8 below.

Example 40

Production of Polymer Polyol (I-40)

A polymer polyol (I-40) was obtained in the same manner as that in Example 39 except that the number of parts of materials of the initial-charge solution and the numbers of materials charged in the first and second steps were those shown in Table 7. The polymer polyol (I-40) was measured and evaluated by the same methods for Example 1. The results are shown in Table 8.

TABLE 7

| | | Example | |
|---|---|---|---|
| | | 39 | 40 |
| Initial-charge solution (L-1) (part) | A1-1 | 930 | 930 |
| | Xylene | 70 | 70 |
| First step (part) | A1-1 | 306.9 | 346.9 |
| | Acrylonitrile | 36 | 36 |
| | Styrene | 84 | 84 |
| | Xylene | 91.6 | 91.6 |
| | D-1 | 40 | 0 |
| | d-1 | 40 | 40 |
| | Divinylbenzene | 0.4 | 0.4 |
| | k-1 | 1.2 | 1.2 |
| Second step (part) | A1-1 | 108.6 | 108.6 |
| | Acrylonitrile | 84 | 84 |
| | Styrene | 196 | 196 |
| | Xylene | 8.4 | 8.4 |
| | k-1 | 2.8 | 2.8 |
| Solution sending rate | First device (part/min) | 126.0 | 126.0 |
| | Second device (part/min) | 210.0 | 210.0 |

TABLE 8

| | Example | |
|---|---|---|
| | 39 (I-39) | 40 (I-40) |
| Volume-average particle diameter (μm) | 0.56 | 0.57 |
| Content of particles having diameter of 10 μm or more (wt %) | 0 | 0 |
| Content of polymer particles (wt %) | 43.4 | 43.2 |
| Viscosity (mPa · s 25° C.) | 4200 | 3800 |
| Conversion ratio (%) | 95.1 | 95.2 |

The results indicated in Table 8 show that the polymer polyols of Examples 39 and 40 had smaller volume-average particle diameters, as compared with those of Comparative Examples 9 to 11 shown in Table 5. Further, the results also show that the contents of particles having diameters of 10 μm or more in the polymer polyols of Examples 39 and 40 were equal to or less than those of Comparative Examples 9 to 11.

Examples 41 and 42

Production of Polyurethane Foams

Polyurethane foams were produced using the polymer polyols (I-39) and (I-40) obtained in Examples 39 and 40, as well as other materials at formulation ratios shown in Table 9, under the same foaming conditions as those of Example 7. The results of measurement of foam properties of these polyurethane foams are shown in Table 9.

TABLE 9

| | | Example | |
|---|---|---|---|
| | | 41 | 42 |
| Formulation ratio (Part) | Polymer polyol | (I-39) | (I-40) |
| | | 75 | 75 |
| | Polyol (A1-1) | 25 | 25 |
| | Water | 2.8 | 2.8 |
| | Catalyst A | 0.06 | 0.06 |
| | Catalyst B | 0.18 | 0.18 |
| | SRX-280A | 0.5 | 0.5 |
| | Polyisocyanate | 35.8 | 35.8 |
| <Foam properties> | | | |
| Density [kg/m$^3$] | | 34.9 | 34.8 |
| 25% ILD [kgf/314 cm$^2$] | | 34.1 | 34.1 |
| Tensile strength [kgf/cm$^2$] | | 1.43 | 1.47 |
| Tear strength [kgf/cm] | | 0.87 | 0.81 |
| Elongation at break [%] | | 109 | 107 |
| Compression set [%] | | 2.7 | 2.8 |

Foam property evaluating methods adopted for Table 9 are the same as described above.

From the results shown in Table 9, the following is clarified. The polyurethane foams of Examples 41 to 42, which were formed of substantially the same raw material compositions as those of Comparative Examples 12 to 14 shown in Table 6 except for the polymer polyols, exhibited excellent 25% ILD (hardness), excellent tensile strengths, and excellent tear strengths.

INDUSTRIAL APPLICABILITY

A polymer polyol of the present invention, and the polyurethane resin of the present invention produced using the polymer polyol obtained by the production method of the present invention are used for various applications in which a usual polyurethane resin is used; particularly, the foregoing polyurethane resin, because of its excellent hardness and strength, suitably is used as a polyurethane foam applied in interior parts of furniture, and the like.

The invention claimed is:

1. A method for producing a polymer polyol (I'), comprising:
   polymerizing an ethylenically unsaturated compound (b) in a disperse medium comprising a polyol (A) having a number-average molecular weight in a range from 1,800 to 15,000, in the presence of an active-hydrogen-containing compound (d) having an aromatic ring and having a number-average molecular weight in a range from 150 to 1,700,
   wherein an amount of the active-hydrogen-containing compound (d) having an aromatic ring is in a range from 1 to 20 wt % relative to a weight of the ethylenically unsaturated compound (b).

2. The method according to claim 1,
   wherein the active-hydrogen-containing compound (d) having an aromatic ring is an alkylene oxide adduct of an active-hydrogen-containing compound (e) having one or more active hydrogen atoms, and
   the active-hydrogen-containing compound (e) has a hydroxyl equivalent and an SP value satisfying Formula (1) and Formula (2) shown below, respectively:

$$80 \leq X \leq 360 \quad (1)$$

$$-0.012 \times X + 14.0 \leq S \leq -0.012 \times X + 17.0 \quad (2),$$

where X represents a hydroxyl equivalent of the active-hydrogen-containing compound (e), and S represents an SP value of the active-hydrogen-containing compound (e).

3. The method according to claim 1,
wherein the ethylenically unsaturated compound (b) is polymerized in a disperse medium comprising the polyol (A), in the presence of the active-hydrogen-containing compound (d) having an aromatic ring and having a number-average molecular weight in the range from 150 to 1,700, and in the presence of a dispersant (D).

4. The method according to claim 3,
wherein the active-hydrogen-containing compound (d) having an aromatic ring is an alkylene oxide adduct of an active-hydrogen-containing compound (e) having one or more active hydrogen atoms, and
the active-hydrogen-containing compound (e) has a hydroxyl equivalent and an SP value satisfying Formula (1) and Formula (2) shown below, respectively:

$$80 \leq X \leq 360 \quad (1)$$

$$-0.012 \times X + 14.0 \leq S \leq -0.012 \times X + 17.0 \quad (2),$$

where X represents a hydroxyl equivalent of the active-hydrogen-containing compound (e), and S represents an SP value of the active-hydrogen-containing compound (e).

5. The method according to claim 3, wherein the polymerizing comprises following steps (1) and (2):
step (1): polymerizing the ethylenically unsaturated compound (b) in the polyol (A), in the presence of the active-hydrogen-containing compound (d) having an aromatic ring and the dispersant (D), so as to obtain a polymer polyol intermediate (B1); and
step (2): adding an additional amount of the ethylenically unsaturated compound (b) to the polymer polyol intermediate (B1) obtained in the step (1), and polymerizing the added ethylenically unsaturated compound (b) in the polymer polyol intermediate (B1), so as to obtain the polymer polyol (I').

6. The method according to claim 3, wherein an amount of the dispersant (D) is in a range from 1 to 30 wt % relative to the weight of the ethylenically unsaturated compound (b).

7. The method according to claim 3,
wherein an amount of the active-hydrogen-containing compound (d) having an aromatic ring is at least 5 wt % relative to a sum of an amount of the active-hydrogen-containing compound (d) and an amount of the dispersant (D).

8. The method according to claim 3,
wherein the dispersant (D) is at least one dispersant selected from the group consisting of a dispersant (D1) and a dispersant (D2),
wherein the dispersant (D1) is a vinyl oligomer having a number-average molecular weight in a range from 1,000 to 1,000,000, and
the dispersant (D2) is an unsaturated polyol having a nitrogen-containing bond, the polyol being formed by bonding a saturated polyol (f) with a monofunctional active hydrogen-containing compound (g) having at least one ethylenically unsaturated group via a polyisocyanate (h),
wherein an average value of a ratio of a number of unsaturated groups relative to a number of nitrogen-containing bonds originating from an NCO group in one molecule of the polyol is in a range from 0.1:1 to 0.4:1.

9. The method according to claim 3, wherein the polymerizing comprises following steps (1) and (2), and optionally step (3):
step (1): polymerizing the ethylenically unsaturated compound (b) in the polyol (A), in the presence of the active-hydrogen-containing compound (d) having an aromatic ring and the dispersant (D), so as to obtain a polymer polyol intermediate (B1);
step (2): adding an additional amount of the ethylenically unsaturated compound (b) to the polymer polyol intermediate (B1) obtained in the step (1), and polymerizing the added ethylenically unsaturated compound (b) in the polymer polyol intermediate (B1), so as to obtain a polymer polyol intermediate (B2); and
step (3): adding an additional amount of the ethylenically unsaturated compound (b) to the polymer polyol intermediate (B2) obtained in the step (2), and polymerizing the added ethylenically unsaturated compound (b) in the polymer polyol intermediate (B2), so as to obtain a polymer polyol intermediate (B3),
wherein the step (3) optionally is repeated once or more by adding an additional amount of the ethylenically unsaturated compound (b) to a resultant polymer polyol intermediate in a previous polymerizing step, and polymerizing the added ethylenically unsaturated compound (b) in the resultant polymer polyol intermediate obtained in the previous polymerizing step, so as to obtain a resultant polyol intermediate in the respective optionally repeated step.

10. The method according to claim 3, wherein the polymerizing comprises following steps (1) and (2),
step (1): polymerizing the ethylenically unsaturated compound (b) in the polyol (A), in the presence of the active-hydrogen-containing compound (d) having an aromatic ring and the dispersant (D) in a first reaction container, so as to obtain a polymer polyol intermediate (B1); and
step (2): adding the polymer polyol intermediate (B1) obtained in the step (1) and a combination that comprises additional amounts of the ethylenically unsaturated compound (b) and the polyol (A), to a second reaction container and polymerizing the added ethylenically unsaturated compound (b) in the presence of the polymer polyol intermediate (B1) and the combination, so as to obtain a polymer polyol intermediate (B2).

11. A method for producing a polyurethane resin by reacting a polyol component and an isocyanate component with each other,
wherein the polyol component comprises at least one polyol selected from the group consisting of a polymer polyol (I) and a polymer polyol (I'),
where the polymer polyol (I) comprises:
a polyol (A) having a number-average-molecular weight in a range from 1,800 to 15,000;
polymer particles (B) obtained by polymerization of an ethylenically unsaturated compound (b); and
an active-hydrogen-containing compound (d) having an aromatic ring and having a number-average molecular weight in a range from 150 to 1,700, and
a content of the active-hydrogen-containing compound (d) is in a range from 1 to 20% relative to a weight of the polymer particles (B), and
where the polymer polyol (I') is obtained by a method comprising;
polymerizing an ethylenically unsaturated compound (h) in a disperse medium containing a polyol (A) having a number-average molecular weight in a range from 1800 to 15,000, in the presence of an activehydrogen-containing compound (d) having an aromatic ring and having a number-average molecular weight in the range from 150 to 1,700, and an amount of the active-hydrogen-containing compound (d) having an aromatic ring is in a range from 1 to 20 wt % relative to a weight of the ethylenically unsaturated compound (b).

12. The method according to claim 11, wherein an amount of the at least one polymer polyol selected from the group consisting of the polymer polyol (I) and the polymer polyol (I') is in a range from 10 to 100% on a weight basis relative to the polyol component.

13. The method according to claim 11,
wherein the polymer polyol (I') as the at least one polyol is obtained by a method comprising: polymerizing an ethylenically unsaturated compound (b) in a disperse medium comprising a polyol (A) having a number-average molecular weight in the range from 1800 to 15,000, in the presence of an active-hydrogen-containing compound (d) having an aromatic ring and having a number-average molecular weight in the range from 150 to 1,700, and further in the presence of a dispersant (D).

* * * * *